US012258433B2

(12) United States Patent
Park et al.

(10) Patent No.: US 12,258,433 B2
(45) Date of Patent: Mar. 25, 2025

(54) TRANSITION METAL COMPOUND FOR A CATALYST FOR OLEFIN POLYMERIZATION, CATALYST FOR OLEFIN POLYMERIZATION COMPRISING THE SAME, AND POLYOLEFIN PREPARED USING THE SAME

(71) Applicant: HANWHA SOLUTIONS CORPORATION, Seoul (KR)

(72) Inventors: Seongyeon Park, Daejeon (KR); Ranwha Park, Daejeon (KR); Won Jong Lee, Daejeon (KR); Hyunseung Lee, Daejeon (KR); Wook Jeong, Daejeon (KR); Taeho Jeong, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 607 days.

(21) Appl. No.: 17/627,826

(22) PCT Filed: Jul. 17, 2020

(86) PCT No.: PCT/KR2020/009414

§ 371 (c)(1),
(2) Date: Jan. 18, 2022

(87) PCT Pub. No.: WO2021/020778

PCT Pub. Date: Feb. 4, 2021

(65) Prior Publication Data

US 2022/0275115 A1 Sep. 1, 2022

(30) Foreign Application Priority Data

Jul. 30, 2019 (KR) ........................ 10-2019-0092126

(51) Int. Cl.
*C07F 17/00* (2006.01)
*C08F 4/659* (2006.01)
*C08F 4/6592* (2006.01)
*C08F 210/16* (2006.01)

(52) U.S. Cl.
CPC .......... *C08F 4/65927* (2013.01); *C07F 17/00* (2013.01); *C08F 4/65912* (2013.01); *C08F 4/65916* (2013.01); *C08F 210/16* (2013.01); *C08F 2420/07* (2021.01); *C08F 2420/09* (2021.01)

(58) Field of Classification Search
CPC ..... C07F 17/00; C08F 4/65927; C08F 210/16
See application file for complete search history.

(56) References Cited

U.S. PATENT DOCUMENTS

| | | | |
|---|---|---|---|
| 5,747,405 | A | 5/1998 | Little |
| 5,856,547 | A | 1/1999 | Jung |
| 6,313,239 | B1 | 11/2001 | Seyferth |
| 2004/0152591 | A1 | 8/2004 | Jin |
| 2005/0288462 | A1 | 12/2005 | Jensen |

FOREIGN PATENT DOCUMENTS

| | | |
|---|---|---|
| JP | 2004-352707 A | 12/2004 |

OTHER PUBLICATIONS

KR Office Action dated Dec. 8, 2022.

*Primary Examiner* — Caixia Lu
(74) *Attorney, Agent, or Firm* — Harvest IP Law, LLP

(57) ABSTRACT

The present invention relates to a transition metal compound for a catalyst for olefin polymerization and to a catalyst for olefin polymerization comprising the same. Specifically, the present invention relates to a transition metal compound for a catalyst for olefin polymerization in which an allyltrimethylsilane substituent is introduced into the carbon-bridged cyclopentadienyl fluorenyl backbone and to a catalyst for olefin polymerization comprising the same.

15 Claims, No Drawings

TRANSITION METAL COMPOUND FOR A CATALYST FOR OLEFIN POLYMERIZATION, CATALYST FOR OLEFIN POLYMERIZATION COMPRISING THE SAME, AND POLYOLEFIN PREPARED USING THE SAME

CROSS-REFERENCE TO RELATED APPLICATIONS

This application is a National Stage of International Application No. PCT/KR2020/009414 filed Jul. 17, 2020, claiming priority based on Korean Patent Application No. 10-2019-0092126 filed Jul. 30, 2019.

TECHNICAL FIELD

The present invention relates to a transition metal compound for a catalyst for olefin polymerization, to a catalyst for olefin polymerization comprising the same, and to a polyolefin prepared using the same. Specifically, the present invention relates to a transition metal compound for a catalyst for olefin polymerization in which an allyltrimethylsilane substituent is introduced into the carbon-bridged cyclopentadienyl fluorenyl backbone, to a catalyst for olefin polymerization comprising the same, and to a polyolefin prepared using the same.

BACKGROUND ART

A metallocene catalyst, which is one of the catalysts used in the polymerization of olefins, is a compound in which a ligand such as cyclopentadienyl, indenyl, and cycloheptadienyl is coordinated to a transition metal or a transition metal halide compound. It has a sandwich structure in its basic form.

In a Ziegler-Natta catalyst, which is another catalyst used in the polymerization of olefins, the metal component serving as the active sites is dispersed on an inert solid surface, whereby the properties of the active sites are not uniform. On the other hand, since a metallocene catalyst is a single compound having a specific structure, it is known as a single-site catalyst in which all active sites have the same polymerization characteristics. A polymer prepared by such a metallocene catalyst is characterized by a narrow molecular weight distribution, a uniform distribution of comonomers, and a higher copolymerization activity than Ziegler-Natta catalysts.

However, there is still a need for a metallocene catalyst for olefin polymerization that has high activity and enhanced copolymerizability and is capable of preparing a resin having a high molecular weight.

DETAILED DESCRIPTION OF THE INVENTION

Technical Problem

An object of the present invention is to provide a transition metal compound for a catalyst for olefin polymerization that has high activity, is capable of producing a resin having excellent physical properties, and has a novel structure, a metallocene catalyst for olefin polymerization comprising the same, and a polyolefin prepared using the same.

Technical Solution

According to an embodiment of the present invention for achieving the object, there is provided a transition metal compound represented by Formula A.

[Formula 1]

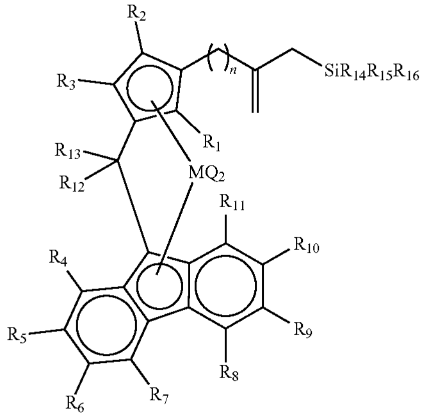

In Formula 1, n is an integer of 1 to 20,

M is titanium (Ti), zirconium (Zr), or hafnium (Hf),

Q is each independently halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, $C_{6-20}$ arylamido, or $C_{1-20}$ alkylidene, $R_1$ to $R_3$ and $R_4$ to $R_{11}$ are each independently hydrogen, substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, wherein $R_1$ to $R_3$ and $R_4$ to $R_{11}$ are each independently capable of being linked to adjacent groups to form a substituted or unsubstituted, saturated or unsaturated $C_{4-20}$ ring, $R_{12}$ and $R_{13}$ are each independently substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, wherein $R_{12}$ and $R_{13}$ are capable of being linked to form a substituted or unsubstituted saturated or unsaturated $C_{2-20}$ ring, and $R_{14}$ to $R_{16}$ are each independently substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl.

Specifically, in Formula 1, n is 1 or 2, M is zirconium or hafnium, Q is each halogen or substituted or unsubstituted $C_{1-20}$ alkyl, $R_1$ to $R_3$ are each hydrogen, $R_4$ to $R_{11}$ are each hydrogen or substituted or unsubstituted $C_{1-20}$ alkyl, $R_{12}$ and $R_{13}$ are each substituted or unsubstituted $C_{1-20}$ alkyl or substituted or unsubstituted $C_{6-20}$ aryl, or $R_{12}$ and $R_{13}$ are capable of being linked to form a substituted or unsubstituted saturated or unsaturated $C_{2-20}$ ring, and $R_{14}$ to $R_{16}$ are each substituted or unsubstituted $C_{1-20}$ alkyl or substituted or unsubstituted $C_{6-20}$ aryl.
Preferably, the compound represented by Formula 1 may be any one of the compounds represented by Formulae 1-1 to 1-36.
[Formula 1-1]
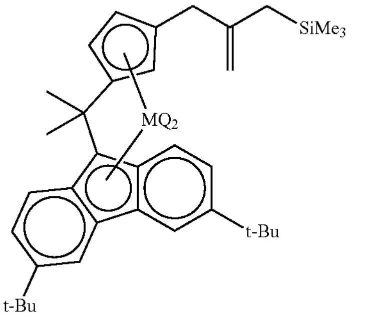
[Formula 1-2]
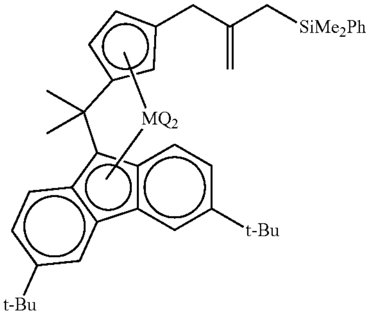
[Formula 1-3]
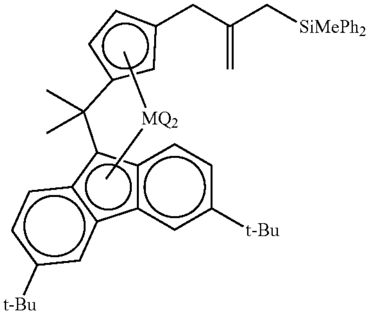
[Formula 1-4]
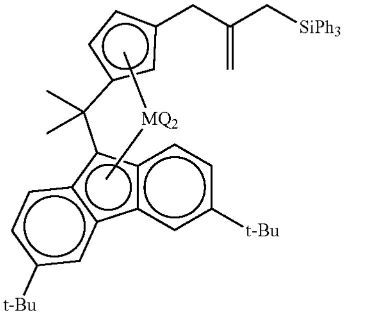
-continued
[Formula 1-5]
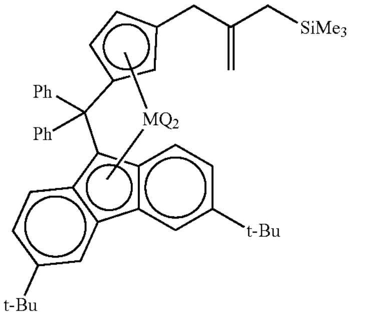
[Formula 1-6]
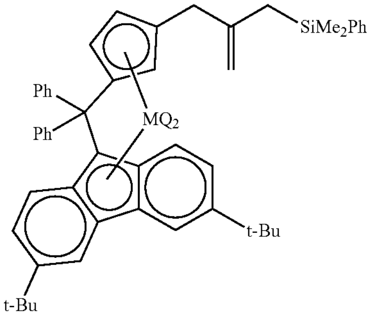
[Formula 1-7]
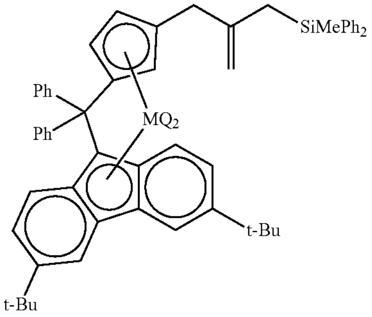
[Formula 1-8]
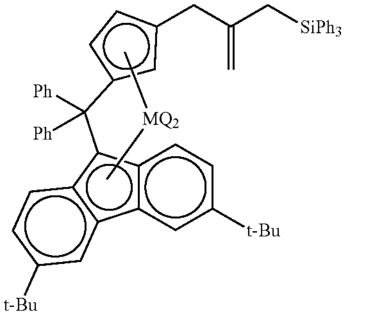
[Formula 1-9]
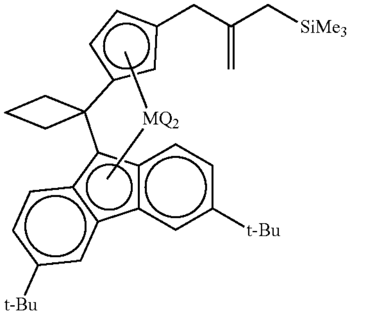

-continued
[Formula 1-10]
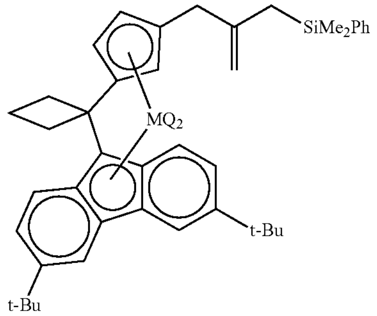
[Formula 1-11]
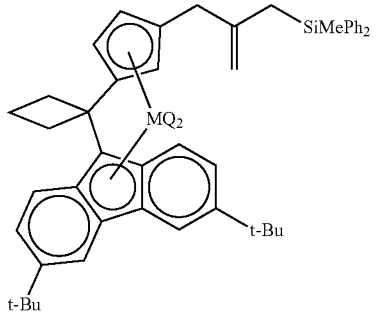
[Formula 1-12]
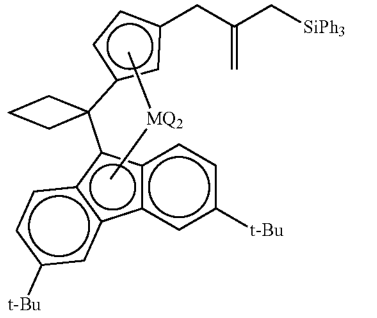
[Formula 1-13]
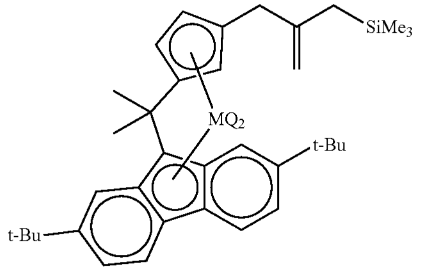
[Formula 1-14]
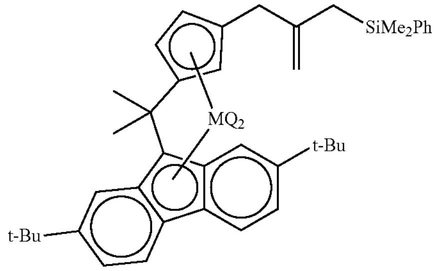
-continued
[Formula 1-15]
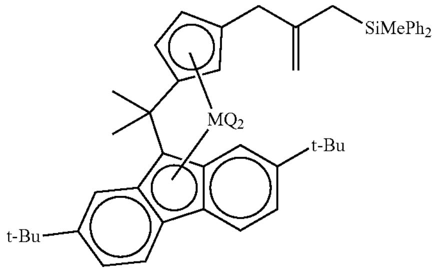
[Formula 1-16]
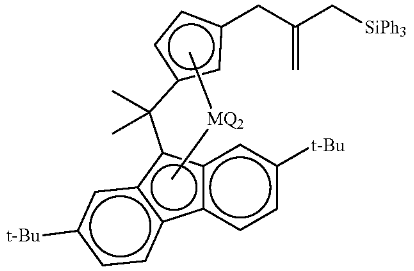
[Formula 1-17]
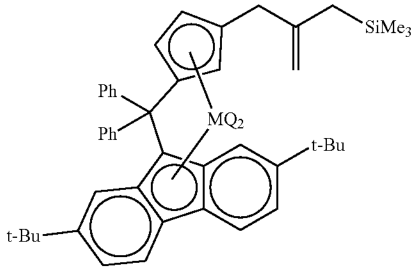
[Formula 1-18]
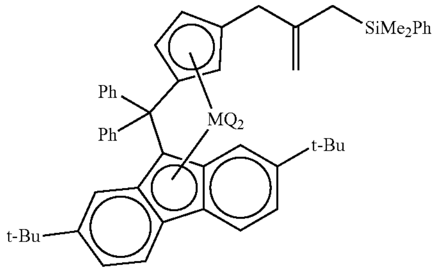
[Formula 1-19]
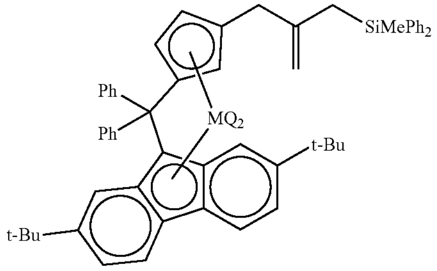

-continued
[Formula 1-20]
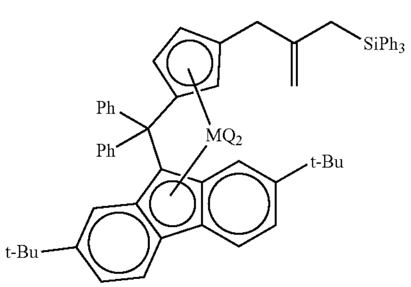
[Formula 1-21]
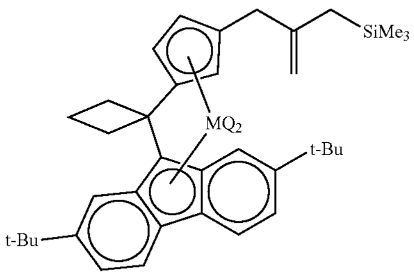
[Formula 1-22]
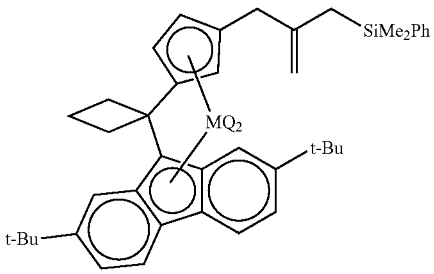
[Formula 1-23]
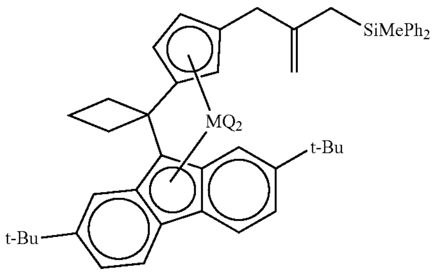
[Formula 1-24]
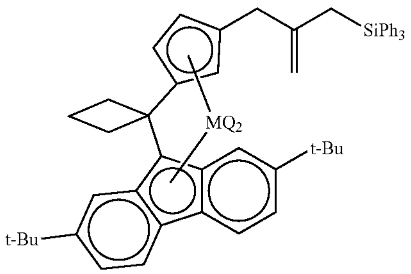
-continued
[Formula 1-25]
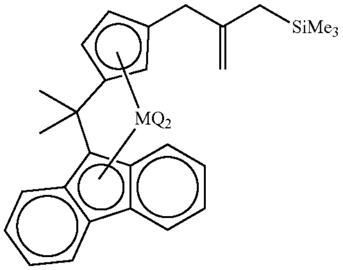
[Formula 1-26]
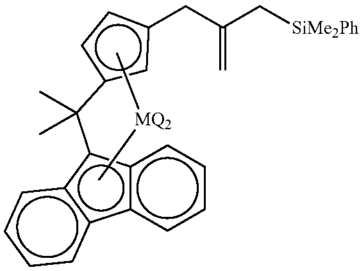
[Formula 1-27]
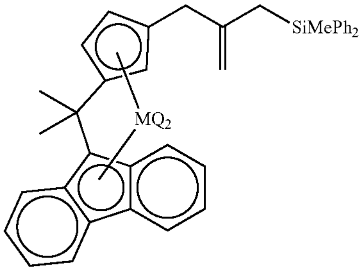
[Formula 1-28]
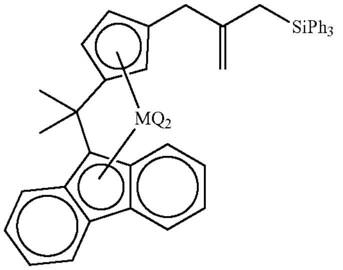
[Formula 1-29]
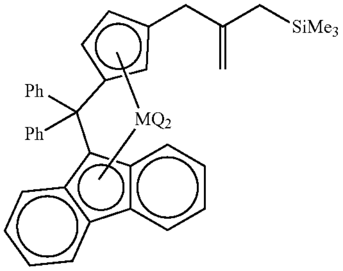

-continued
[Formula 1-30]
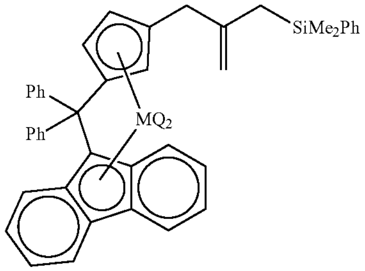
[Formula 1-31]
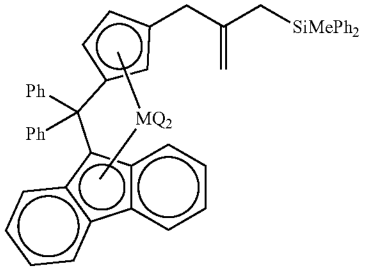
[Formula 1-32]
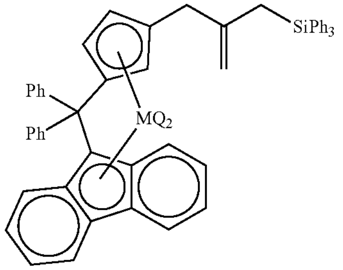
[Formula 1-33]
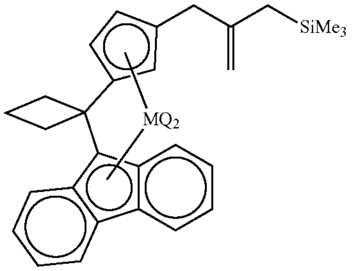
[Formula 1-34]
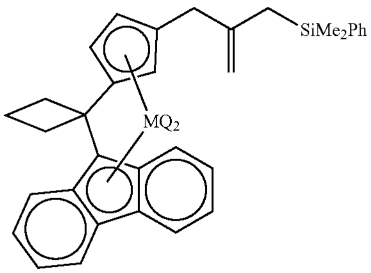
-continued
[Formula 1-35]
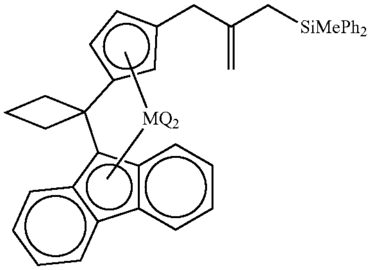
[Formula 1-36]
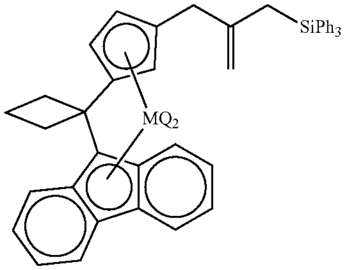
In Formulae 1-1 to 1-38, M is zirconium or hafnium, Q is each halogen or substituted or unsubstituted $C_{1-20}$ alkyl, Me is a methyl group, t-Bu is a t-butyl group, and Ph is a phenyl group.
More preferably, the compound represented by Formula 1 may be any one of the compounds by Formulae 1-37 to 1-39.
[Formula 1-37]
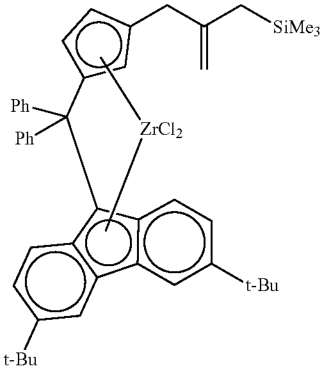
[Formula 1-38]
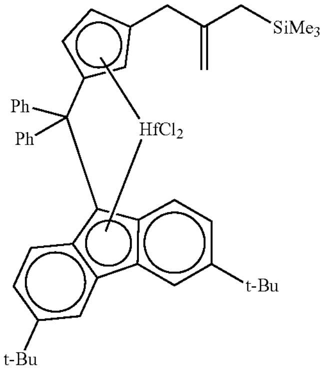

-continued

[Formula 1-39]

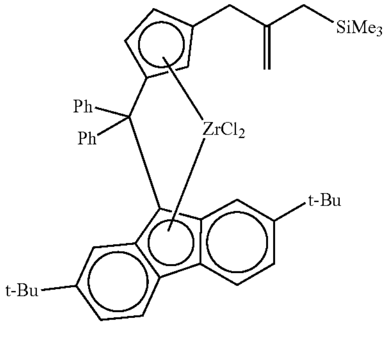

In Formulae 1-37 to 1-39, Me is a methyl group, t-Bu is a t-butyl group, and Ph is a phenyl group.

According to another embodiment of the present invention, there is provided a catalyst for olefin polymerization, which comprises the transition metal compound; and a cocatalyst compound.

Specifically, the cocatalyst compound may be at least one selected from the group consisting of a compound represented by Formula 2, a compound represented by Formula 3, and a compound represented by Formula 4.

[Formula 2]

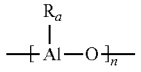

[Formula 3]

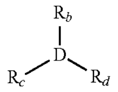

[Formula 4]

$[L—H]^+[Z(A)_4]^-$ or $[L]^+[Z(A)_4]^-$

In Formula 2, n is an integer of 2 or more, and $R_a$ may each independently be a halogen atom, $C_{1-20}$ hydrocarbon, or $C_{1-20}$ hydrocarbon substituted with halogen, in Formula 3, D is aluminum (Al) or boron, and $R_b$, $R_c$, and $R_d$ are each independently a halogen atom, $C_{1-20}$ hydrocarbon, $C_{1-20}$ hydrocarbon substituted with halogen, or $C_{1-20}$ alkoxy, and in Formula 4, L is a neutral or cationic Lewis acid, $[L-H]^+$ and $[L]^+$ a Brönsted acid, Z is a group 13 element, and A is each independently substituted or unsubstituted $C_{6-20}$ aryl or substituted or unsubstituted $C_{1-20}$ alkyl.

Specifically, the compound represented by Formula 2 is at least one selected from the group consisting of methylaluminoxane, ethylaluminoxane, isobutylaluminoxane, and butylaluminoxane.

In addition, the compound represented by Formula 3 is at least one selected from the group consisting of trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentyaluminum, trihexyaluminum, trioctyaluminum, ethyl dimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, and tributylboron.

In addition, the compound represented by Formula 4 is at least one selected from the group consisting of triethylammonium tetraphenylborate, tributylammonium tetraphenylborate, trimethylammonium tetraphenylborate, tripropylammonium tetraphenylborate, trimethylammonium tetra(p-tolyl)borate, trimethylammonium tetra(o,p-dimethylphenyl) borate, tributylammonium tetra(p-trifluoromethylphenyl) borate, trimethylammonium tetra(p-trifluoromethylphenyl) borate, tributylammonium tetrapentafluorophenylborate, N,N-diethylanilinium tetraphenylborate, N,N-diethylanilinium tetrapentafluorophenylborate, diethylammonium tetrapentafluorophenylborate, triphenylphosphonium tetraphenylborate, trimethylphosphonium tetraphenylborate, triethylammonium tetraphenylaluminate, tributylammonium tetraphenylaluminate, trimethylammonium tetraphenylaluminate, tripropylammonium tetraphenylaluminate, trimethylammonium tetra(p-tolyl)aluminate, tripropylammonium tetra(p-tolyl)aluminate, triethylammonium tetra(o,p-dimethylphenyl)aluminate, tributylammonium tetra(p-trifluoromethylphenyl)aluminate, trimethylammonium tetra(p-trifluoromethylphenyl)aluminate, tributylammonium tetrapentafluorophenylaluminate, N,N-diethylanilinium tetraphenylaluminate, N,N-diethylanilinium tetrapentafluorophenylaluminate, diethylammonium tetrapentatetraphenylaluminate, triphenylphosphonium tetraphenylaluminate, trimethylphosphonium tetraphenylaluminate, tripropylammonium tetra(p-tolyl)borate, triethylammonium tetra(o,p-dimethylphenyl)borate, tributylammonium tetra(p-trifluoromethylphenyl)borate, triphenylcarbonium tetra(p-trifluoromethylphenyl)borate, and triphenylcarbonium tetrapentafluorophenylborate.

Preferably, the catalyst for olefin polymerization further comprises a carrier for supporting the transition metal compound. Specifically, the carrier may support both of the transition metal compound and the cocatalyst.

Specifically, the carrier may comprise at least one selected from the group consisting of silica, alumina, and magnesia.

Here, the amount of the transition metal compound supported on the carrier is 0.001 to 1 mmole based on 1 g of the carrier, and the amount of the cocatalyst compound supported on the carrier is 2 to 15 mmoles based on the 1 g of the carrier.

According to another embodiment of the present invention, there is provided a polyolefin prepared by polymerizing an olefinic monomer in the presence of the catalyst for olefin polymerization.

Here, the olefinic monomer may be at least one selected from the group consisting of a $C_{2-20}$ alpha-olefin, a $C_{1-20}$ diolefin, a $C_{3-20}$ cycloolefin, and a $C_{3-20}$ cyclodiolefin.

Specifically, the polyolefin may be obtained by copolymerizing ethylene and 1-hexene.

ADVANTAGEOUS EFFECTS OF THE INVENTION

Since the transition metal compound for a catalyst for olefin polymerization and the metallocene catalyst for olefin polymerization comprising the same according to an embodiment of the present invention has a unique three-dimensional structure, it is possible to control the physical properties of a polymer.

BEST MODE FOR CARRYING OUT THE INVENTION

Hereinafter, the present invention will be described in more detail.

Transition Metal Compound for a Catalyst for Olefin Polymerization

According to an embodiment of the present invention, there is provided a transition metal compound represented by Formula A.

[Formula 1]

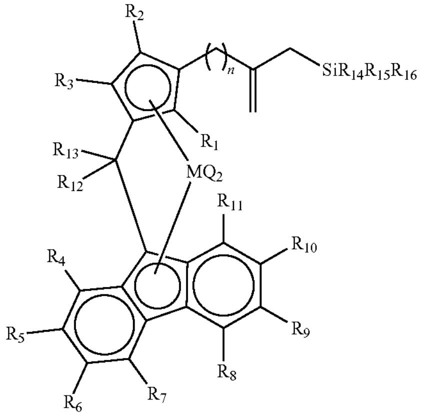

In Formula 1, n is an integer of 1 to 20, preferably an integer of 1 to 10, more preferably an integer of 1 to 5. Specifically, n may be 1 or 2.

M is titanium (Ti), zirconium (Zr), or hafnium (Hf). Specifically, M may be zirconium or hafnium.

Q is each independently halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, $C_{6-20}$ arylamido, or $C_{1-20}$ alkylidene, Specifically, Q may each be halogen or substituted or unsubstituted $C_{1-20}$ alkyl. More specifically, Q may each be chlorine.

$R_1$ to $R_3$ and $R_4$ to $R_{11}$ are each independently hydrogen, substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl. Specifically, $R_1$ to $R_3$ may each be halogen, and $R_4$ to $R_{11}$ may each be halogen or substituted or unsubstituted $C_{1-20}$ alkyl. In addition, $R_1$ to $R_3$ and $R_4$ to $R_{11}$ are each independently capable of being linked to adjacent groups to form a substituted or unsubstituted, saturated or unsaturated $C_{4-20}$ ring.

$R_{12}$ and $R_{13}$ are each independently substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, wherein $R_{12}$ and $R_{13}$ are capable of being linked to form a substituted or unsubstituted saturated or unsaturated $C_{2-20}$ ring. Specifically, $R_{12}$ and $R_{13}$ may each be substituted or unsubstituted $C_{1-20}$ alkyl or substituted or unsubstituted $C_{6-20}$ aryl, or $R_{12}$ and $R_{13}$ may be linked to form a substituted or unsubstituted $C_{2-20}$ ring. More specifically, $R_{12}$ and $R_{13}$ may each be methyl or phenyl, or $R_{12}$ and $R_{13}$ may be linked to form a $C_{3-4}$ ring.

$R_{14}$ to $R_{16}$ are each independently substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl. Specifically, $R_{14}$ to $R_{16}$ may each be substituted or unsubstituted $C_{1-20}$ alkyl or substituted or unsubstituted $C_{6-20}$ aryl. More specifically, $R_{14}$ to $R_{16}$ may each be methyl or phenyl.

In a preferred embodiment of the present invention, the compound represented by Formula 1 may be any one of the compounds represented by Formulae 1-1 to 1-36.

[Formula 1-1]

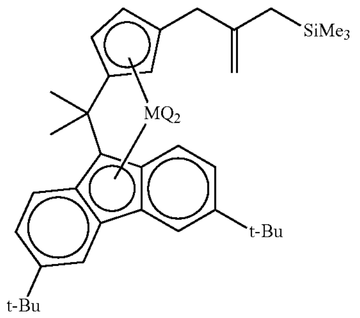

[Formula 1-2]

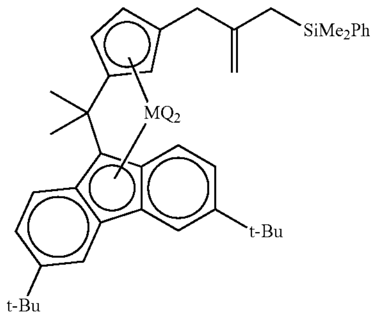

[Formula 1-3]

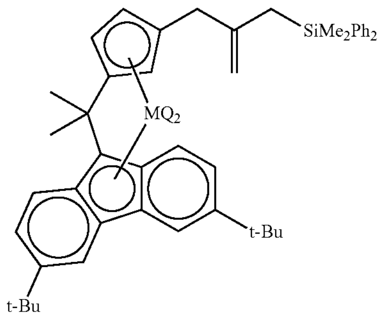

-continued
[Formula 1-4]
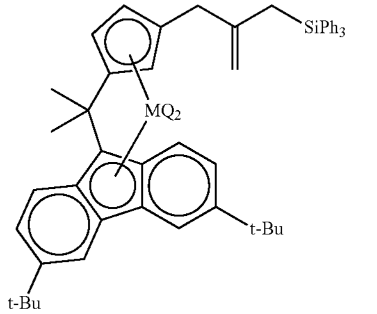
[Formula 1-5]
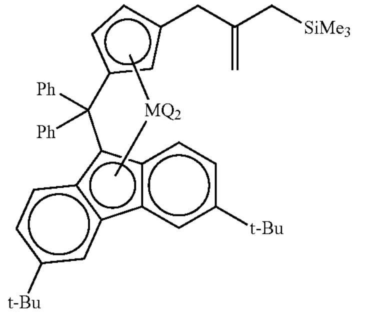
[Formula 1-6]
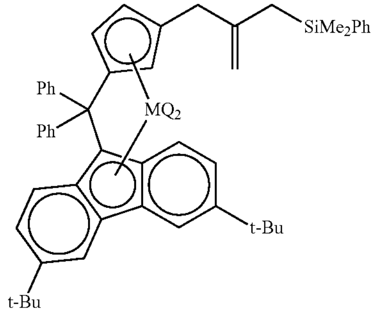
[Formula 1-7]
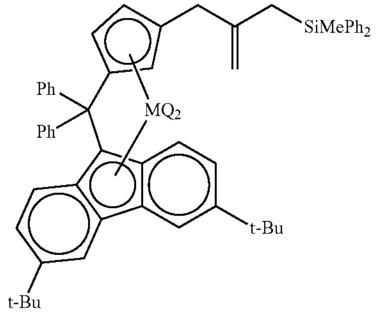
[Formula 1-8]
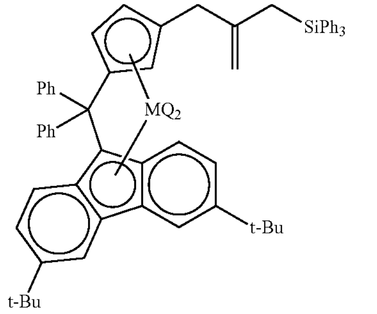
-continued
[Formula 1-9]
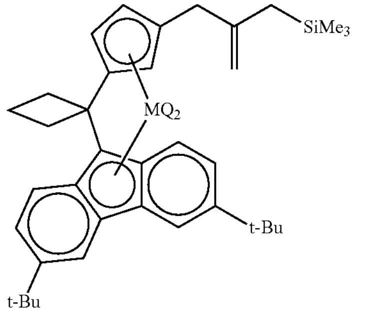
[Formula 1-10]
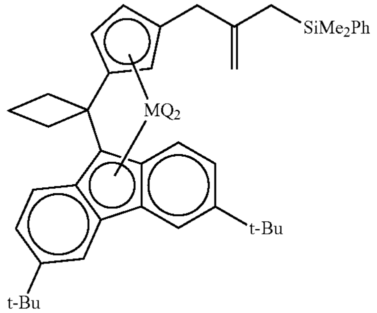
[Formula 1-11]
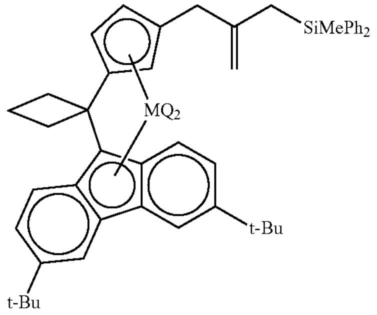
[Formula 1-12]
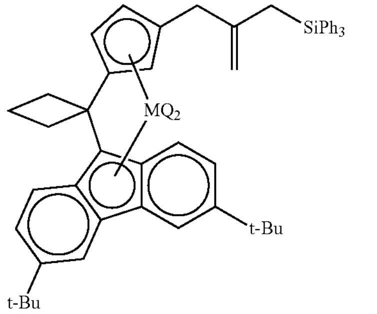
[Formula 1-13]
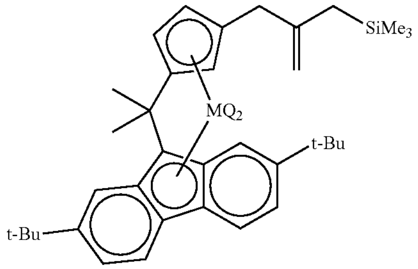

-continued
[Formula 1-14]
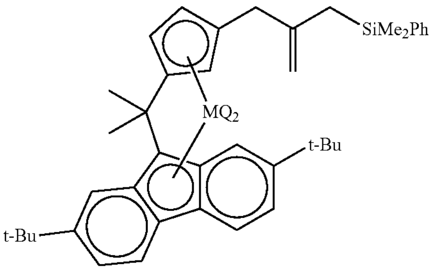
[Formula 1-15]
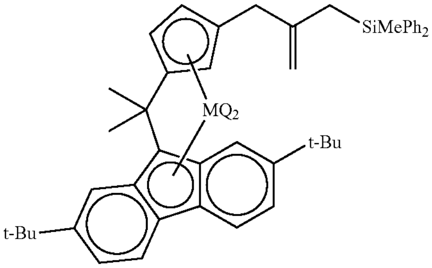
[Formula 1-16]
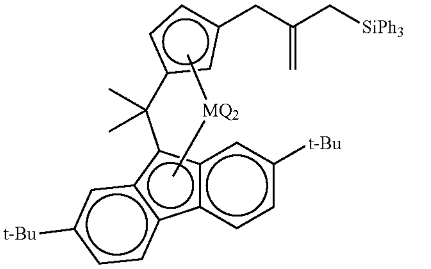
[Formula 1-17]
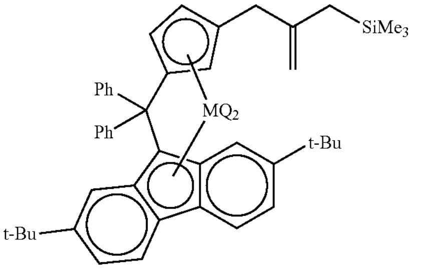
[Formula 1-18]
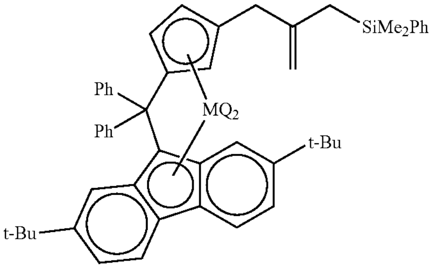
-continued
[Formula 1-19]
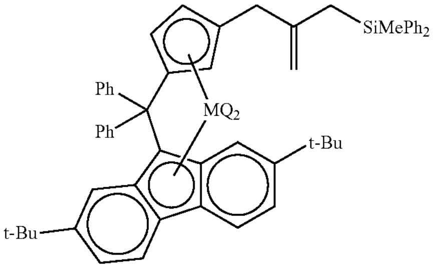
[Formula 1-20]
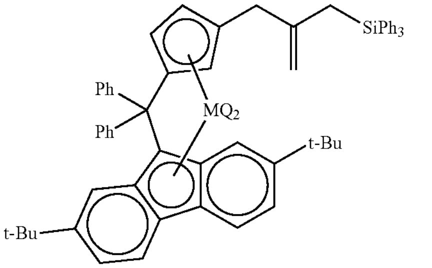
[Formula 1-21]
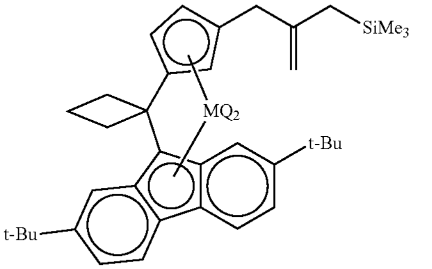
[Formula 1-22]
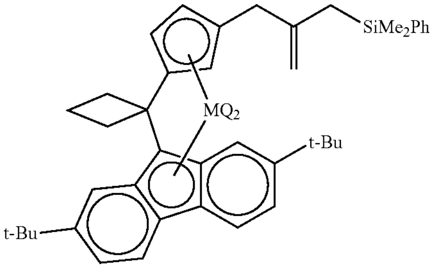
[Formula 1-23]
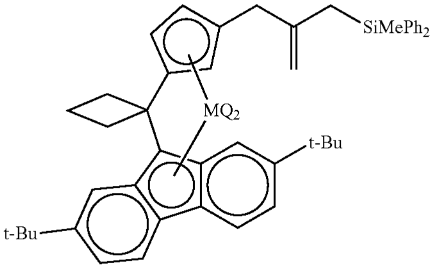

-continued
[Formula 1-24]
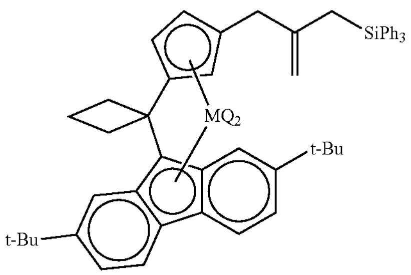
[Formula 1-25]
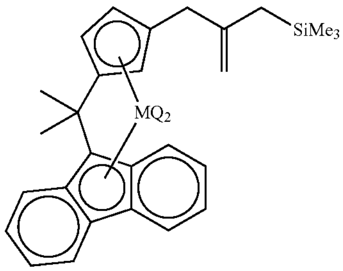
[Formula 1-26]
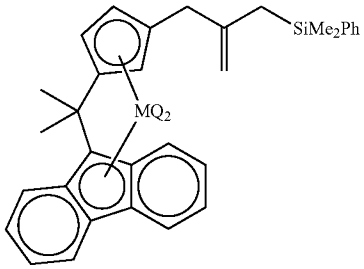
[Formlula 1-27]
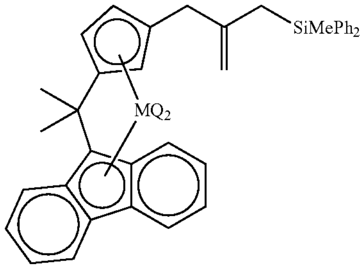
[Formula 1-28]
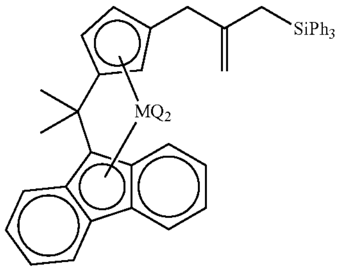
-continued
[Formula 1-29]
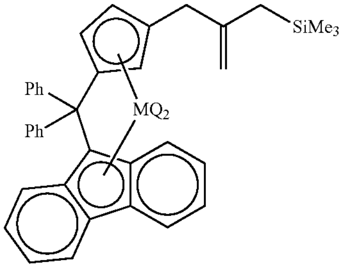
[Formula 1-30]
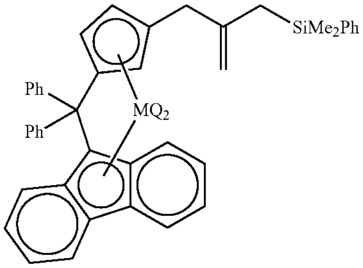
[Formula 1-31]
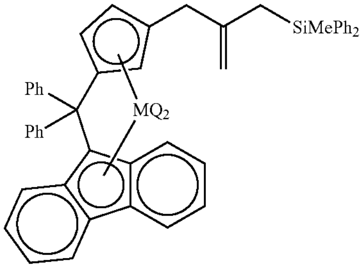
[Formula 1-32]
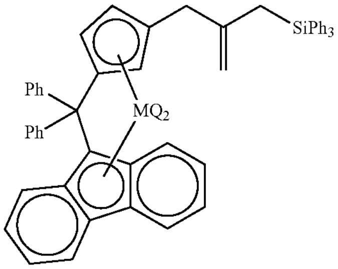
[Formula 1-33]
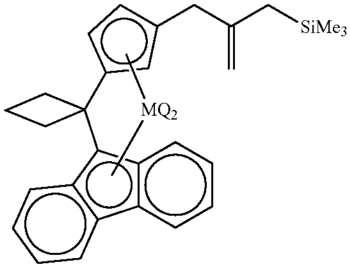
[Formula 1-34]
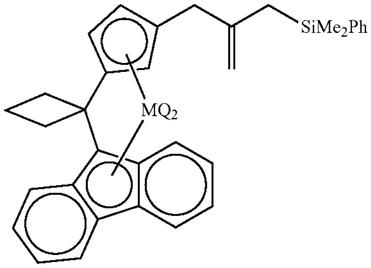

-continued

[Formula 1-35]

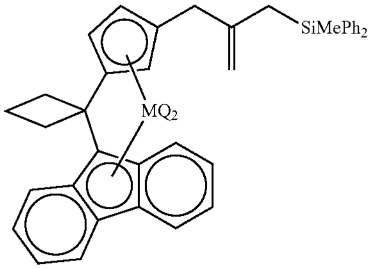

[Formula 1-36]

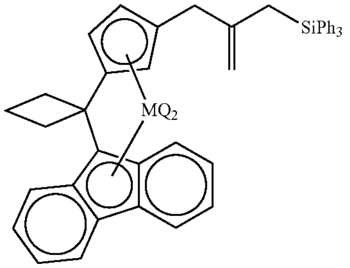

In Formulae 1-1 to 1-36 above, M is zirconium or hafnium, Q is each halogen or substituted or unsubstituted $C_{1-20}$ alkyl, preferably chlorine or a butyl group, Me is a methyl group, t-Bu is a t-butyl group, and Ph is a phenyl group.

In a more preferred embodiment of the present invention, the compound represented by Formula 1 may be any one of the compounds represented by Formulae 1-37 to 1-39.

[Formula 1-37]

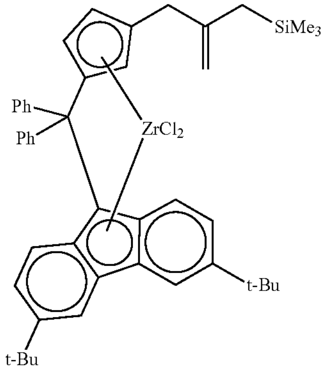

[Formula 1-38]

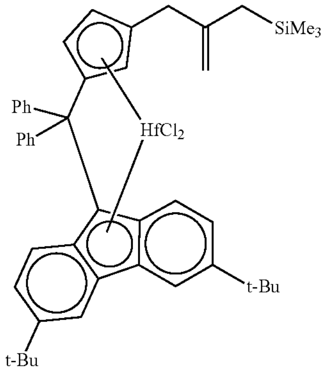

-continued

[Formula 1-39]

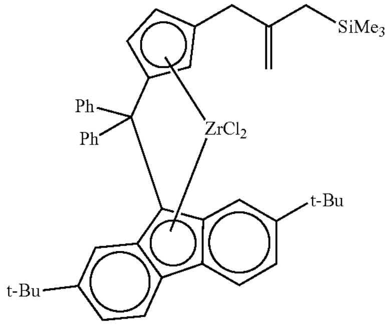

In Formulae 1-37 to 1-39, Me is a methyl group, t-Bu is a t-butyl group, and Ph is a phenyl group.

Catalyst for Olefin Polymerization

According to another embodiment of the present invention, there is provided a catalyst for olefin polymerization, which comprises a transition metal compound represented by Formula 1; and a cocatalyst compound.

[Formula 1]

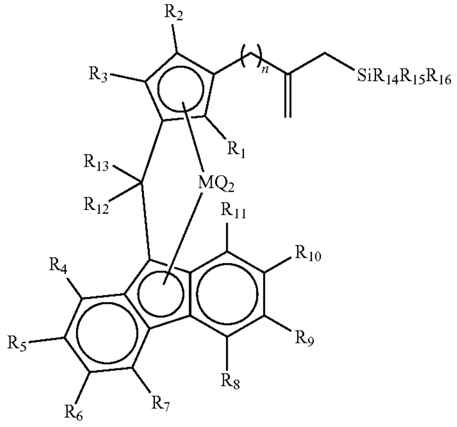

In Formula 1, n, M, Q, and $R_1$ to $R_{16}$ are as described above in the section of the transition metal compound.

In a preferred embodiment of the present invention, the compound represented by Formula 1 may be any one of the compounds represented by Formulae 1-1 to 1-36.

[Formula 1-1]

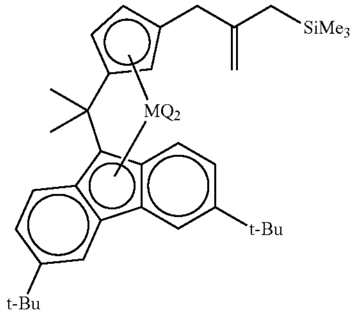

-continued
[Formula 1-2]
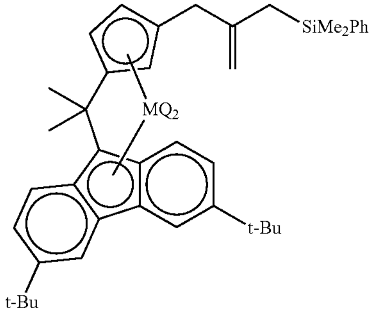
[Formula 1-3]
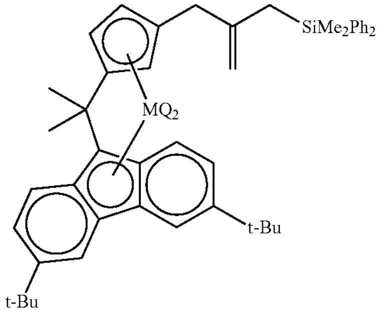
[Formula 1-4]
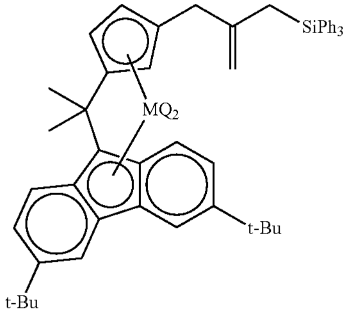
[Formula 1-5]
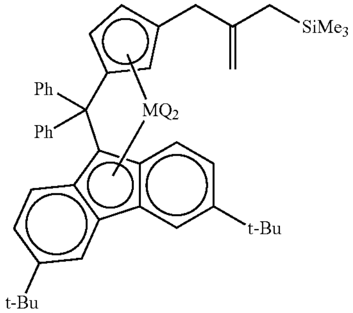
[Formula 1-6]
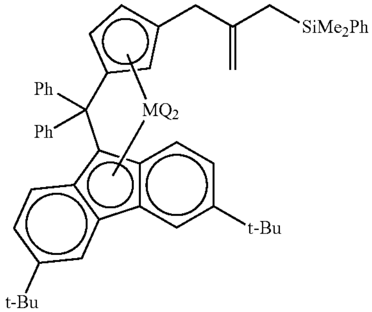
-continued
[Formula 1-7]
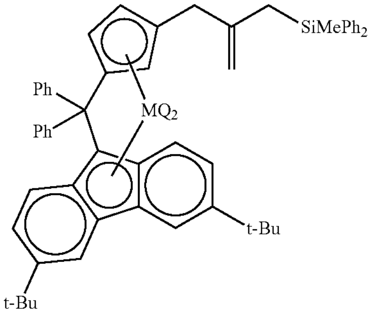
[Formula 1-8]
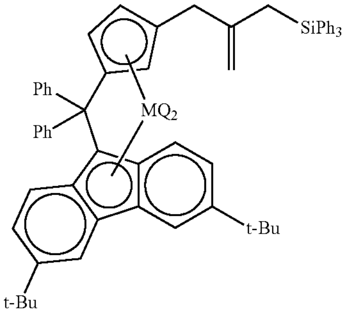
[Formula 1-9]
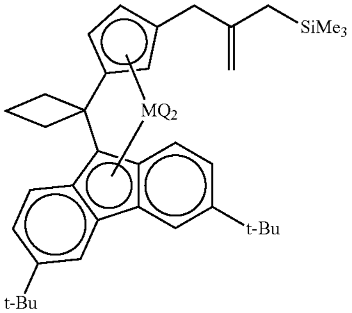
[Formula 1-10]
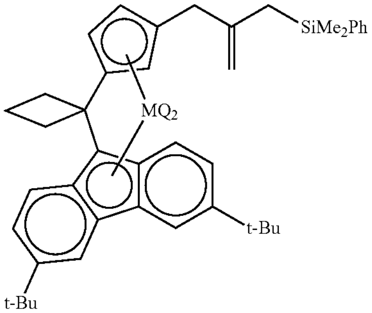
[Formula 1-11]
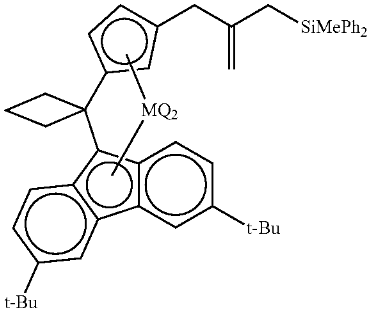

-continued
[Formula 1-12]
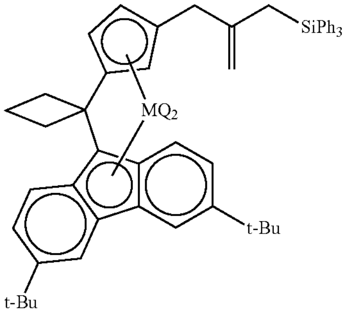
[Formula 1-13]
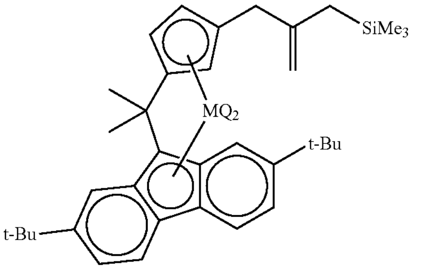
[Formula 1-14]
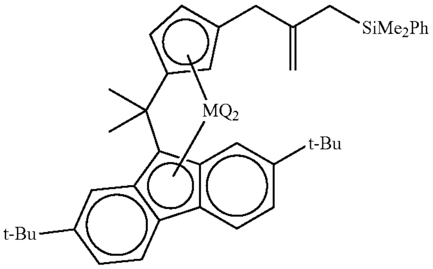
[Formula 1-15]
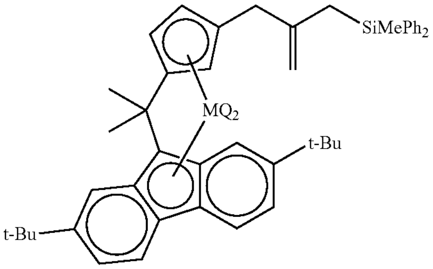
[Formula 1-16]
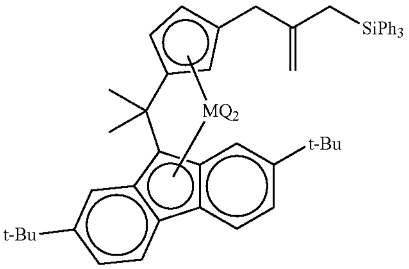
-continued
[Formula 1-17]
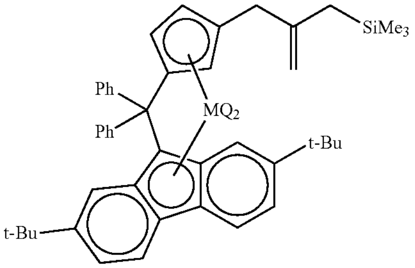
[Formula 1-18]
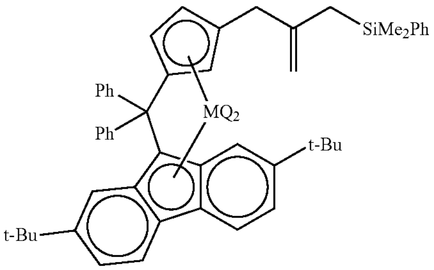
[Formula 1-19]
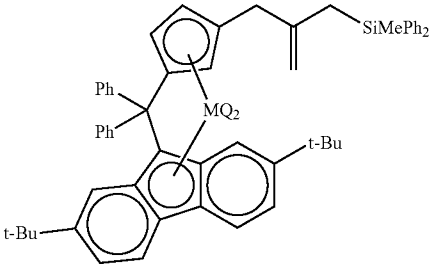
[Formula 1-20]
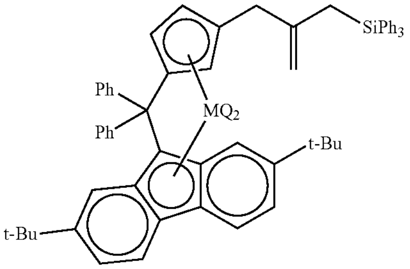
[Formula 1-21]
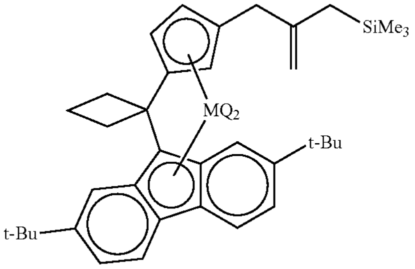

-continued
[Formula 1-22]
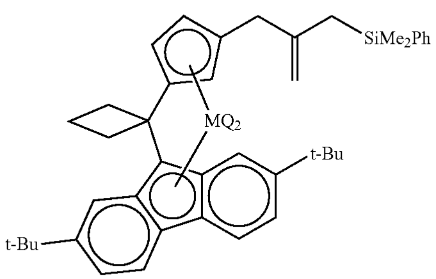
[Formula 1-23]
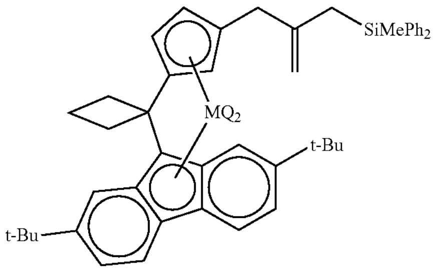
[Formula 1-24]
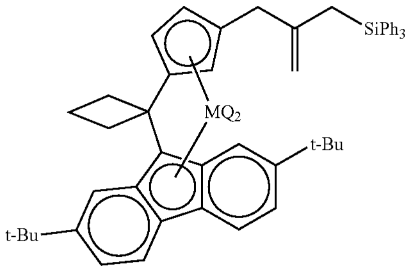
[Formula 1-25]
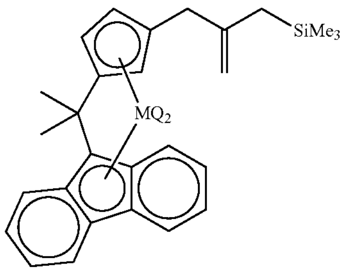
[Formula 1-26]
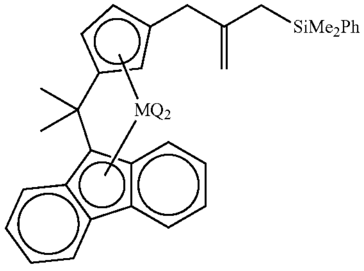
-continued
[Formlula 1-27]
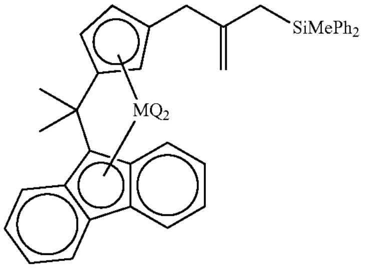
[Formula 1-28]
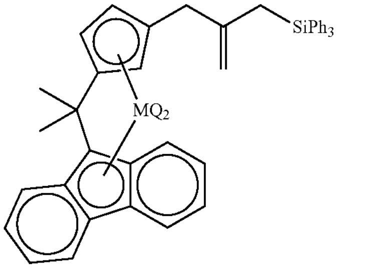
[Formula 1-29]
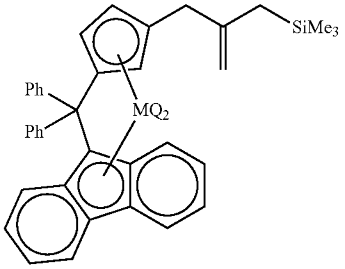
[Formula 1-30]
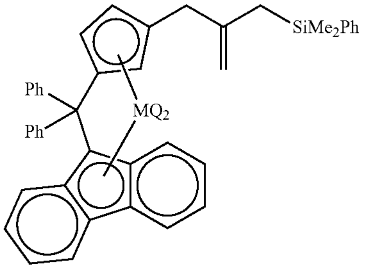
[Formula 1-31]
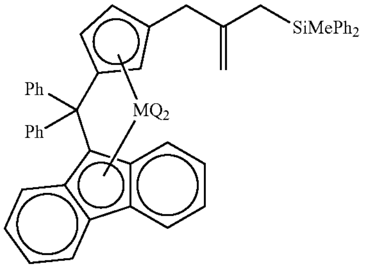

-continued

[Formula 1-32]

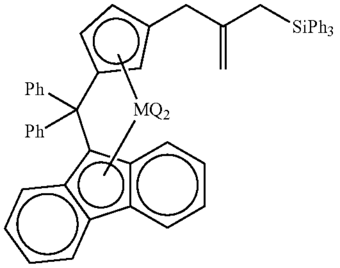

[Formula 1-33]

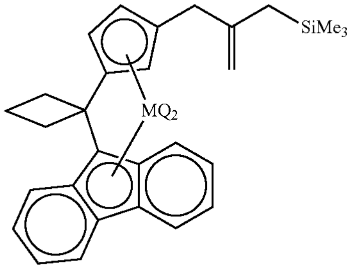

[Formula 1-34]

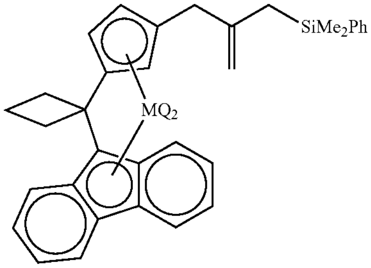

[Formula 1-35]

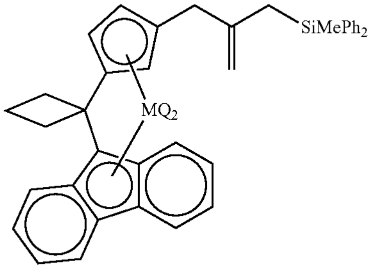

[Formula 1-36]

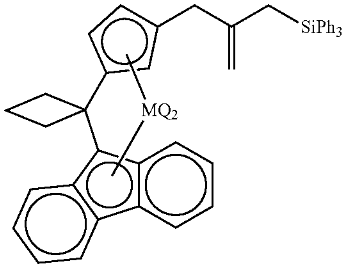

In Formulae 1-1 to 1-36, M, Q, Me, t-Bu, and Ph are as described above in the section of the transition metal compound.

In a more preferred embodiment of the present invention, the compound represented by Formula 1 may be any one of the compounds represented by Formulae 1-37 to 1-39.

[Formula 1-37]

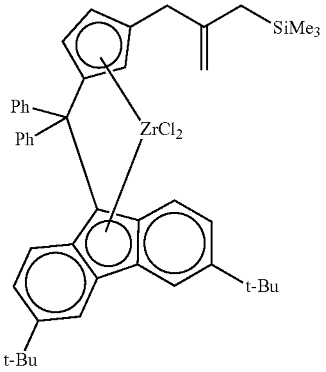

[Formula 1-38]

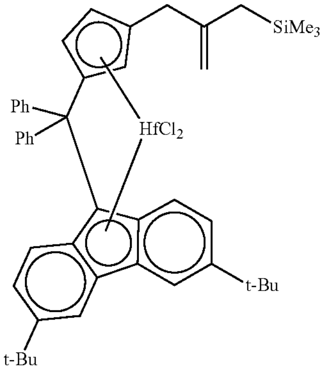

[Formula 1-39]

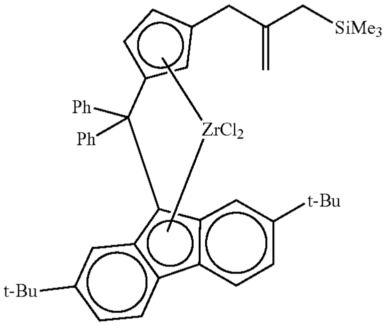

in Formulae 1-37 to 1-39, Me, t-Bu, and Ph are as described above in the section of the transition metal compound.

Meanwhile, the cocatalyst compound may comprise at least one of a compound represented by Formula 2, a compound represented by Formula 3, and a compound represented by Formula 4.

[Formula 2]

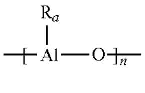

In Formula 2, n is an integer of 2 or more, and $R_a$ may each independently be halogen, $C_{1-20}$ hydrocarbon, or $C_{1-20}$ hydrocarbon substituted with halogen. Specifically, $R_a$ may be methyl, ethyl, n-butyl, or isobutyl.

[Formula 3]

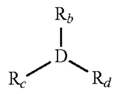

In Formula 3, D is aluminum (Al) or boron, and $R_b$, $R_c$, and $R_d$ are each independently a halogen atom, $C_{1-20}$ hydrocarbon, $C_{1-20}$ hydrocarbon substituted with halogen, or $C_{1-20}$ alkoxy. Specifically, when D is aluminum (Al), $R_b$, $R_c$, and $R_d$ may each independently be methyl or isobutyl, and when D is boron (B), $R_b$, $R_c$, and $R_d$ may each be pentafluorophenyl.

$[L-H]^+[Z(A)_4]^-$ or $[L]^+[Z(A)_4]^-$ [Formula 4]

In Formula 4, L is a neutral or cationic Lewis acid, $[L-H]^+$ and $[L]^+$ a Brönsted acid, Z is a group 13 element, and A is each independently substituted or unsubstituted $C_{6-20}$ aryl or substituted or unsubstituted $C_{1-20}$ alkyl. Specifically, $[LH]^+$ may be a dimethylanilinium cation, $[Z(A)_4]^-$ may be $[B(C_6F5)_4]^-$, and $[L]^+$ may be $[(C_6H5)_3C]^+$.

Specifically, examples of the compound represented by Formula 2 include methylaluminoxane, ethylaluminoxane, isobutylaluminoxane, butylaluminoxane, and the like. Preferred is methylaluminoxane. But it is not limited thereto.

Examples of the compound represented by Formula 3 include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentyaluminum, trihexyaluminum, trioctyaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, and tributylboron. Preferred are trimethylaluminum, triethylaluminum, and triisobutylaluminum. But it is not limited thereto.

Examples of the compound represented by Formula 4 include triethylammonium tetraphenylborate, tributylammonium tetraphenylborate, trimethylammonium tetraphenylborate, tripropylammonium tetraphenylborate, trimethylammonium tetra(p-tolyl)borate, trimethylammonium tetra (o,p-dimethylphenyl)borate, tributylammonium tetra(p-trifluoromethylphenyl)borate, trimethylammonium tetra(p-trifluoromethylphenyl)borate, tributylammonium tetrapentafluorophenylborate, N,N-diethylanilinium tetraphenylborate, N,N-diethylanilinium tetrapentafluorophenylborate, diethylammonium tetrapentafluorophenylborate, triphenylphosphonium tetraphenylborate, trimethylphosphonium tetraphenylborate, triethylammonium tetraphenylaluminate, tributylammonium tetraphenylaluminate, trimethylammonium tetraphenylaluminate, tripropylammonium tetraphenylaluminate, trimethylammonium tetra(p-tolyl)aluminate, tripropylammonium tetra(p-tolyl)aluminate, triethylammonium tetra(o,p-dimethylphenyl)aluminate, tributylammonium tetra(p-trifluoromethylphenyl)aluminate, trimethylammonium tetra (p-trifluoromethylphenyl)aluminate, tributylammonium tetrapentafluorophenylaluminate, N,N-diethylanilinium tetraphenylaluminate, N,N-diethylanilinium tetrapentafluorophenylaluminate, diethylammonium tetrapentatetraphenylaluminate, triphenylphosphonium tetraphenylaluminate, trimethylphosphonium tetraphenylaluminate, tripropylammonium tetra(p-tolyl)borate, triethylammonium tetra(o,p-dimethylphenyl)borate, tributylammonium tetra(p-trifluoromethylphenyl)borate, triphenylcarbonium tetra(p-trifluoromethylphenyl)borate, and triphenylcarbonium tetrapentafluorophenylborate.

In a preferred embodiment of the present invention, the catalyst for olefin polymerization may further comprise a carrier for supporting the transition metal compound. Specifically, the carrier may support both of the transition metal compound and the cocatalyst.

In such an event, the carrier may comprise a material containing a hydroxyl group on its surface. Preferably, a material that has been dried to remove moisture from its surface and has a highly reactive hydroxyl group and a siloxane group may be used. For example, the carrier may comprise at least one selected from the group consisting of silica, alumina, and magnesia. Specifically, silica, silica-alumina, and silica-magnesia dried at high temperatures may be used as a carrier. They usually contain oxides, carbonates, sulfates, and nitrates components such as $Na_2O$, $K_2CO_3$, $BaSO_4$, and $Mg(NO_3)_2$. In addition, they may comprise carbon, zeolite, magnesium chloride, and the like. However, the carrier is not limited thereto. It is not particularly limited as long as it can support the transition metal compounds and the cocatalyst compound.

As a method of supporting the transition metal compounds and the cocatalyst compound employed in a catalyst for olefin polymerization on the carrier, a physical adsorption method or a chemical adsorption method may be used.

For example, the physical adsorption method may be a method of contacting a solution in which a transition metal compound has been dissolved with a carrier and then drying the same; a method of contacting a solution in which a transition metal compound and a cocatalyst compound have been dissolved with a carrier and then drying the same; or a method of contacting a solution in which a transition metal compound has been dissolved with a carrier and then drying the same to prepare the carrier that supports the transition metal compound, separately contacting a solution in which a cocatalyst compound has been dissolved with a carrier and then drying the same to prepare the carrier that supports the cocatalyst compound, and then mixing them.

The chemical adsorption method may be a method of supporting a cocatalyst compound on the surface of a carrier, and then supporting a transition metal compound on the cocatalyst compound; or a method of covalently bonding a functional group on the surface of a carrier (e.g., a hydroxy group (—OH) on the silica surface in the case of silica) with a catalyst compound.

The amount of the transition metal compound supported on a carrier may be 0.001 to 1 mmole based on 1 g of the carrier. When the content ratio of the transition metal compounds and the carrier satisfies the above range, an appropriate activity of the supported catalyst may be exhibited, which is advantageous from the viewpoint of maintaining the activity of the catalyst and economical efficiency.

The amount of the cocatalyst compound supported on a carrier may be 2 to 15 mmoles based on the 1 g of the carrier. When the content ratio of the cocatalyst compound and the carrier satisfies the above range, it is advantageous from the viewpoint of maintaining the activity of the catalyst and economical efficiency.

One or two or more types of a carrier may be used. For example, both the transition metal compound and the cocatalyst compound may be supported on one type of a carrier, or the transition metal compound and the cocatalyst compound may be supported on two or more types of a carrier, respectively. In addition, either one of the transition metal compound and the cocatalyst compound may be supported on a carrier.

Polymerization of Olefin

An olefinic monomer may be polymerized in the presence of the catalyst for olefin polymerization according to an embodiment of the present invention to prepare a polyolefin.

Here, the polyolefin may be a homopolymer of an olefinic monomer or a copolymer of an olefinic monomer and an olefinic comonomer.

The olefinic monomer is at least one selected from the group consisting of a $C_{2-20}$ alpha-olefin, a $C_{1-20}$ diolefin, a $C_{3-20}$ cycloolefin, and a $C_{3-20}$ cyclodiolefin.

For example, the olefinic monomer may be ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, or the like, and the polyolefin may be a homopolymer comprising only one olefinic monomer or a copolymer comprising two or more olefinic monomers exemplified above.

As an exemplary example, the polyolefin may be a copolymer in which ethylene and a $C_{3-20}$ alpha-olefin are copolymerized. Preferred is a copolymer in which ethylene and 1-hexene are copolymerized. But it is not limited thereto.

In such an event, the content of ethylene is preferably 55 to 99.9% by weight, more preferably 90 to 99.9% by weight. The content of the alpha-olefinic comonomer is preferably 0.1 to 45% by weight, more preferably 0.1 to 10% by weight.

The polyolefin according to an embodiment of the present invention may be prepared by polymerization reaction such as free radical, cationic, coordination, condensation, and addition, but it is not limited thereto.

As a preferred example, the polyolefin may be prepared by a gas phase polymerization method, a solution polymerization method, a slurry polymerization method, or the like. When the polyolefin is prepared by a solution polymerization method or a slurry polymerization method, examples of a solvent that may be used include $C_{5-12}$ aliphatic hydrocarbon solvents such as pentane, hexane, heptane, nonane, decane, and isomers thereof; aromatic hydrocarbon solvents such as toluene and benzene; hydrocarbon solvents substituted with chlorine atoms such as dichloromethane and chlorobenzene; and mixtures thereof, but it is not limited thereto.

EMBODIMENTS FOR CARRYING OUT THE INVENTION

Example

Hereinafter, the present invention will be described in detail with reference to Examples, However, the following examples are intended to further illustrate the present invention. The scope of the present invention is not limited thereto only.

Preparation Example 1: Preparation of Diphenylmethylidene [(3,6-di-tert-butylfluorenyl){(2-trimethylsilylmethylallyl)cyclopentadienyl}] Zirconium Dichloride (Formula 1-37)

Preparation of 2-(trimethylsilylmethyl)-2-propen-1-ol

A solution of potassium carbonate ($K_2CO_3$) (18.6 g, 173 mmoles) dissolved in distilled water (22 ml) was slowly added to a solution of 2-(trimethylsilylmethyl)allyl acetate (25 g, 173 mmoles) dissolved in methanol (220 ml). Upon completion of the addition, it was stirred at room temperature for 4 hours. After stirring, distilled water was added thereto to terminate the reaction. The organic layer was extracted with diethyl ether, and residual water was removed using magnesium sulfate ($MgSO_4$). All the solvents were removed under vacuum to obtain 17.4 g (90%) of a pale beige oily compound.

$^1$H-NMR ($CDCl_3$, 300 MHz): δ4.90-4.88 (m, 1H), 4.66 (s, 1H), 3.97 (s, 2H), 1.53 (s, 2H), 0.03 (s, 9H).

Preparation of 2-(trimethylsilylmethyl) Methanesulfonate

Methanesulfonyl chloride (20.72 g, 181 mmoles) was slowly added at 0° C. to a solution of 2-(trimethylsilylmethyl)-2-propen-1-ol (17.4 g, 121 mmoles) and triethylamine (22 g, 217 mmoles) diluted in dichloromethane (275 ml). Thereafter, it was stirred at 0° C. for 3 hours. An aqueous solution of sodium hydrogen carbonate ($NaHCO_3$) was added thereto at 0° C. to terminate the reaction, and the organic layer was then extracted with dichloromethane Residual water was removed using sodium sulfate ($Na_2SO_4$), and all the solvents were removed under vacuum to obtain 25 g (93%) of a yellow oily compound.

$^1$H-NMR ($CDCl_3$, 300 MHz): δ5.03 (d, 1H), 4.84 (s, 1H), 4.56 (s, 2H), 3.02 (s, 3H), 1.60 (s, 2H), 0.06 (s, 9H).

Preparation of 2-(trimethylsilylmethyl)allyl Bromide

Lithium bromide (48.82 g, 562 mmoles) was slowly added at room temperature to a solution of 2-(trimethylsilylmethyl) methanesulfonate (25 g, 112 mmoles) diluted in tetrahydrofuran (THF; 400 ml). It was then stirred at 70° C. for 4 hours. Distilled water was added thereto at 0° C. to terminate the reaction, and the organic layer was then extracted with diethyl ether. Residual water was removed using sodium sulfate, and all the solvents were removed under vacuum to obtain 18 g (78%) of a yellow oily compound.

$^1$H-NMR ($CDCl_3$, 300 MHz): δ5.04 (s, 1H), 4.74 (d, 1H), 3.90 (d, 2H), 1.72 (d, 2H), 0.05 (s, 9H).

Preparation of [2-(cyclopentadienylmethyl)allyl] trimethylsilane

Sodium cyclopentadienide (40.75 g, 104 mmoles, 2 M in THF) was slowly added dropwise at −30° C. to a solution of 2-(trimethylsilylmethyl)allyl bromide (18 g, 86.9 mmoles) diluted in tetrahydrofuran (400 ml), and the temperature was gradually raised to room temperature, followed by stirring thereof for 12 hours. Distilled water was added thereto at 0° C. to terminate the reaction, and the organic layer was then extracted with diethyl ether. Residual water was removed using magnesium sulfate, and it was subjected to separation by column chromatography (hexane) to obtain 13 g (78%) of a pale beige oily compound.

$^1$H-NMR ($CDCl_3$, 300 MHz): δ6.42-6.02 (m, 4H), 4.60-4.55 (m, 2H), 3.06-2.97 (m, 2H), 2.87-2.85 (m, 2H), 1.54 (s, 2H), 0.03 (d, 9H).

Preparation of 2-[2-(trimethylsilylmethyl)allyl] Cyclopentadienyl Lithium

N-butyllithium (n-BuLi) (1.44 g, 2.93 mmoles, 1.6 M hexane solution) was slowly added at −30° C. to a solution of [2-(cyclopentadienylmethyl)allyl] trimethylsilane (620 mg, 3.22 mmoles) diluted in tetrahydrofuran (10 ml), and the temperature was gradually raised to room temperature, followed by stirring thereof for 12 hours. The solvents in the reaction solution were removed under vacuum, hexane was added thereto, followed by stirring thereof for 15 minutes. The resulting solid was filtered and dried under vacuum to obtain 528 mg (83%) of a pale yellow solid compound.

Preparation of 2-[2-(trimethylsilylmethyl)allyl]-6,6-diphenylfulvene

A solution of benzophenone (460 mg, 2.52 mmoles) diluted in tetrahydrofuran (5 ml) was slowly added at −30°

C. to a solution of 2-[2-(trimethylsilylmethyl)allyl] cyclopentadienyl lithium (500 mg, 2.52 mmoles) diluted in tetrahydrofuran (5 ml). The temperature was gradually raised to room temperature, and it was stirred under reflux at 70° C. for 4 hours. Distilled water was added thereto to terminate the reaction, and the organic layer was then extracted with diethyl ether. Residual water was removed using magnesium sulfate, and it was subjected to separation by column chromatography (hexane) to obtain 653 mg (72%) of an orange liquid compound.

$^{1}$H-NMR ($CDCl_3$, 300 MHz): δ7.36-7.27 (m, 10H), 6.45 (dd, 1H), 6.24 (dd, 1H), 6.00 (s, 1H), 4.66 (s, 1H), 4.59 (s, 1H), 3.07 (s, 2H), 1.54 (s, 2H), 0.04 (s, 9H).

Preparation of (3,6-di-tert-butylfluorenyl) [(2-trimethylsilylmethylallyl)cyclopentadienyl]-1,1-diphenylmethane A solution of 2-[2-(trimethylsilylmethyl)allyl]-6,6-diphenylfulvene (350 mg, 0.98 mmole) diluted in tetrahydrofuran (3 ml) was slowly added at −30° C. to a solution of (3,6-di-t-butylfluorenyl) lithium (558 mg, 1.96 mmoles) diluted in tetrahydrofuran (4 ml). The temperature was gradually raised to room temperature, and it was stirred for 12 hours. Distilled water was added thereto to terminate the reaction, and the organic layer was then extracted with diethyl ether. Residual water was removed using magnesium sulfate, and it was subjected to separation by column chromatography (hexane) to obtain 420 mg (67%) of a pale orange solid compound.

$^{1}$H-NMR ($CDCl_3$, 300 MHz): δ7.60-7.00 (m, 16H), 5.44-5.33 (m, 3H), 4.49 (m, 2H), 2.61 (m, 2H), 1.47-1.42 (m, 4H), 1.35 (s, 18H), 0.05 (s, 9H).

Preparation of Diphenylmethylidene [(3,6-di-tert-butylfluorenyl) {(2-trimethylsilylmethylallyl)cyclopentadienyl}] Zirconium Dichloride N-butyllithium (338 mg, 0.80 mmole, 1.6 M hexane solution) was slowly added at −30° C. to a solution of (3,6-di-tert-butylfluorenyl)[(2-trimethylsilylmethylallyl)cyclopentadienyl]-1,1-diphenylmethane (250 mg, 0.39 mmole) diluted in diethyl ether (5 ml), and the temperature was gradually raised to room temperature, followed by stirring thereof for 12 hours. Zirconium tetrachloride ($ZrCl_4$) (92 mg, 0.39 mmole) was slowly added to the reaction solution at −30° C., and then the temperature was gradually raised to room temperature, followed by stirring thereof for 12 hours. Upon completion of the reaction, the solvent of the reaction solution was dried under vacuum, and it was dissolved in toluene and filtered. The filtrate was dried under vacuum to obtain 150 mg (48%) of a red solid compound.

$^{1}$H-NMR ($CDCl_3$, 300 MHz): δ8.16 (s, 2H), 7.99-7.89 (m, 4H), 7.46-7.10 (m, 8H), 6.34-6.27 (m, 2H), 6.07 (t, 1H), 5.72 (t, 1H), 5.44 (t, 1H), 4.62 (m, 2H), 3.06 (m, 2H) 1.46 (s, 18H), 1.35 (s, 2H), 0.05 (s, 9H).

Preparation Example 2: Preparation of Diphenylmethylidene [(3,6-di-tert-butylfluorenyl){(2-trimethylsilylmethylallyl)cyclopentadienyl}] Hafnium Dichloride (Formula 1-38)

N-butyllithium (162 mg, 0.382 mmole, 1.6 M hexane solution) was slowly added at −30° C. to a solution in which (3,6-di-tert-butylfluorenyl)[(2-trimethylsilylmethylallyl)cyclopentadienyl]-1,1-diphenylmethane (120 mg, 0.189 mmole) prepared in the same manner as in Preparation Example 2 had been diluted in diethyl ether (2 ml), and the temperature was gradually raised to room temperature, followed by stirring thereof for 12 hours. Hafnium tetrachloride ($HfCl_4$) (61 mg, 0.189 mmole) was slowly added to the reaction solution at −30° C., and then the temperature was gradually raised to room temperature, followed by stirring thereof for 12 hours. Upon completion of the reaction, the solvent of the reaction solution was dried under vacuum, and it was dissolved in toluene and filtered. The filtrate was dried under vacuum to obtain 90 mg (54%) of a yellow solid compound.

$^{1}$H-NMR ($CDCl_3$, 300 MHz): δ8.11 (s, 2H), 7.99-7.86 (m, 4H), 7.44-7.05 (m, 8H), 6.36-6.29 (m, 2H), 5.99 (t, 1H), 5.64 (t, 1H), 5.36 (t, 1H), 4.58 (m, 2H), 3.06 (m, 2H) 1.44 (s, 18H), 1.33 (s, 2H), 0.03 (s, 9H).

Preparation Example 3: Preparation of Diphenylmethylidene [(2,7-di-tert-butylfluorenyl){(2-trimethylsilylmethylallyl)cyclopentadienyl}] Zirconium Dichloride (Formula 1-39)

Preparation of (2,7-di-tert-butylfluorenyl) Lithium

N-butyllithium (1.56 g, 3.66 mmoles, 1.6 M hexane solution) was slowly added at −30° C. to a solution of 2,7-di-tert-butylfluorene (1 g, 3.59 mmoles) diluted in diethyl ether (15 ml), and the temperature was gradually raised to room temperature, followed by stirring thereof for 12 hours. Upon completion of the reaction, all the solvents were removed under vacuum to obtain 1.08 g (100%) of a yellow solid compound.

Preparation of (2,7-di-tert-butylfluorenyl)[(2-trimethylsilylmethylallyl)cyclopentadienyl]-1,1-diphenylmethane A solution of 2-[2-(trimethylsilylmethyl)allyl]-6,6-diphenylfulvene (234 mg, 0.66 mmole) diluted in tetrahydrofuran (1 ml) was slowly added at −30° C. to a solution of (2,7-600 di-tert-butylfluorenyl) lithium (373 mg, 1.31 mmoles) diluted in tetrahydrofuran (2 ml). The temperature was gradually raised to room temperature, and it was stirred for 12 hours. Distilled water was added thereto to terminate the reaction, and the organic layer was then extracted with diethyl ether. Residual water was removed using magnesium sulfate, and it was subjected to separation by column chromatography (hexane) to obtain 146 mg (35%) of a pale orange solid compound.

$^{1}$H-NMR ($CDCl_3$, 300 MHz): δ7.68-7.08 (m, 16H), 5.48-5.10 (m, 3H), 4.62-4.50 (m, 2H), 2.97-2.86(m, 2H), 1.32-1.29 (m, 4H), 1.17 (s, 18H), 0.05 (s, 9H).

Preparation of Diphenylmethylidene [(2,7-di-tert-butylfluorenyl) {(2-trimethylsilylmethylallyl)cyclopentadienyl}] Dilithium N-butyllithium (197 mg, 0.46 mmole, 1.6 M hexane solution) was slowly added at −30° C. to a solution of (2,7-di-tert-butylfluorenyl)[(2-trimethylsilylmethylallyl)cyclopentadienyl]-1,1-diphenylmethane (146 mg, 0.23 mmole) diluted in diethyl ether (2 ml), and the temperature was gradually raised to room temperature, followed by stirring thereof for 12 hours. Upon completion of the reaction, all the solvents were removed under vacuum. The resulting solid was washed with hexane, filtered, and dried under vacuum to obtain 70 mg (47%) of a dark orange solid compound.

Preparation of Diphenylmethylidene [(2,7-di-tert-butylfluorenyl) {(2-trimethylsilylmethylallyl)cyclopentadienyl}] Zirconium Dichloride Zirconium tetrachloride (25 mg, 0.11 mmole) was slowly added at −30° C. to a solution of diphenylmethylidene [(2,7-di-tert-butylfluorenyl) {(2-trimethylsilylmethylallyl) cyclopentadienyl}] dilithium (70 mg, 0.11 mmole) diluted in toluene (1.5 ml), and the temperature was gradually raised to room temperature, followed by stirring thereof for 12 hours. The reaction solution was filtered and dried under vacuum to obtain 55 mg (62%) of an orange solid compound.

$^{1}$H-NMR ($CDCl_3$, 300 MHz): δ7.99-7.94 (m, 2H), 7.86-7.83 (m, 2H), 7.62-7.54 (m, 4H), 7.11-6.91 (m, 6H), 6.51-

6.47 (m, 2H), 6.18 (t, 1H), 5.78 (t, 1H), 5.64 (t, 1H), 4.77-4.70 (m, 2H), 3.28-3.24 (m, 2H), 1.60 (s, 2H), 1.13 (s, 18H), 0.02 (s, 9H).

Example 1: Synthesis of a Copolymer of Ethylene and 1-hexene using the Compound of Formula 1-37

Polyolefin was polymerized using the transition metal compound (compound 1-37) obtained in Example 1. Specifically, a 2-liter autoclave reactor was used for the polymerization. All the reagents used were under inert conditions using a glove box or the Schlenk technique. After foreign substances such as moisture and oxygen were removed under vacuum at 100° C. for about 20 minutes, 1 liter of hexane was injected into the reactor and stirred at 200 rpm, followed by elevation of the temperature to a polymerization temperature of 80° C. Thereafter, compound 1-37 and methylaluminoxane (MAO) as a cocatalyst were mixed in advance at a ratio of Al/Zr=2,000 to prepare a catalyst, which was added to the reactor. Nitrogen was injected such that the total pressure including the vapor pressure of hexane was 1 kgf/cm$^2$, and then 4 kgf/cm$^2$ of ethylene was injected to adjust the total pressure to 5 kgf/cm$^2$. While the reactor was stirred at 1,000 rpm, 1-hexene was added thereto, and polymerization was carried out for 15 minutes. Upon completion of the polymerization, the reaction gas was vented and the reactor was opened to obtain a resulting resin. The resin was dried for 24 hours or longer, and its physical properties were measured. The amounts of the catalyst and 1-hexene used are shown in Table 1 below.

Example 2: Synthesis of a Copolymer of Ethylene and 1-hexene using the Compound of Formula 1-39

Olefin polymerization was carried out in the same manner as in Example 1, except that compound 1-39 was used as the transition metal compound. The amounts of the catalyst and 1-hexene used are shown in Table 1 below.

The physical properties of the polyolefins obtained in Examples 1 and 2 were measured. The results are shown in Table 1 below.

TABLE 1

| | 1-Hexene (ml) | Catalyst (mg) | Activity (T/mol-h) | Activity (gPE/gCat-h) | Mw | PDI | Density (g/cc) | Tm (° C.) | $^{13}$C-NMR No. of branches | $^{13}$C-NMR Mole (%) | $^{13}$C-NMR Weight (%) |
|---|---|---|---|---|---|---|---|---|---|---|---|
| Ex. 1 | 0 | 3.2 | 17.89 | 22,500 | 465,794 | 2.00 | 0.945 | 130.92 | — | — | — |
| | 15 | 3.2 | 29.82 | 37,500 | 325,115 | 1.84 | 0.918 | 105.65 | 11.80 | 2.36 | 6.76 |
| | 3 | 3.2 | 30.81 | 38,750 | 287,930 | 1.74 | 0.899 | 90.82 | 22.94 | 4.59 | 12.61 |
| | 45 | 3.2 | 40.75 | 51,250 | 254,780 | 1.74 | 0.895 | 78.03 | 31.43 | 6.29 | 16.75 |
| Ex. 2 | 0 | 3.2 | 31.81 | 40,000 | 650,647 | 1.89 | 0.931 | 127.79 | — | — | — |
| | 15 | 1.6 | 59.63 | 75,000 | 498,765 | 1.78 | 0.893 | 97.30 | 22.92 | 4.58 | 12.6 |
| | 3 | 1.6 | 73.55 | 92,500 | 418,129 | 1.84 | 0.883 | 79.45/119.04 | 31.21 | 6.24 | 16.65 |
| | 45 | 1.6 | 85.48 | 107,500 | 360,475 | 1.83 | 0.874 | 59.89/119.93 | 47.73 | 9.55 | 24.05 |

INDUSTRIAL APPLICABILITY

According to the embodiment of the present invention, there are provided a transition metal compound for a catalyst for olefin polymerization that has high activity, is capable of producing a resin having excellent physical properties, and has a novel structure, and a metallocene catalyst for olefin polymerization comprising the same.

The invention claimed is:

1. A transition metal compound represented by Formula 1:

[Formula 1]

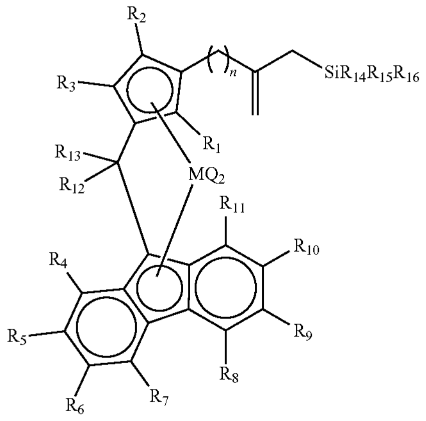

in Formula 1, n is an integer of 1 to 20,

M is titanium (Ti), zirconium (Zr), or hafnium (Hf),

Q is each independently halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, $C_{6-20}$ arylamido, or $C_{1-20}$ alkylidene, $R_1$ to $R_3$ and $R_4$ to $R_{11}$ are each independently hydrogen, substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, wherein $R_1$ to $R_3$ and $R_4$ to $R_{11}$ are each independently optionally of being linked to adjacent groups to form a substituted or unsubstituted, saturated or unsaturated $C_{4-20}$ ring, $R_{12}$ and $R_{13}$ are each independently substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, wherein $R_{12}$ and $R_{13}$ are optionally being linked to form a substituted or unsubstituted saturated or unsaturated $C_{2-20}$ ring, and $R_{14}$ to $R_{16}$ are each independently substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl.

2. The transition metal compound of claim 1, wherein, in Formula 1, n is 1 or 2, M is zirconium or hafnium, Q is each halogen or substituted or unsubstituted $C_{1-20}$ alkyl, $R_1$ to $R_3$ are each hydrogen, $R_4$ to $R_1$1 are each hydrogen or substituted or unsubstituted $C_{1-20}$ alkyl, $R_{12}$ and $R_{13}$ are each substituted or unsubstituted $C_{1-20}$ alkyl or substituted or unsubstituted $C_{6-20}$ aryl, or $R_{12}$ and $R_{13}$ are optionally being linked to form a substituted or unsubstituted saturated or unsaturated $C_{2-20}$ ring, and $R_{14}$ to $R_{16}$ are each substituted or unsubstituted $C_{1-20}$ alkyl or substituted or unsubstituted $C_{6-20}$ aryl.

3. The transition metal compound of claim 1, wherein the compound represented by Formula 1 is any one of the compounds represented by Formulae 1-1 to 1-36:

[Formula 1-1]

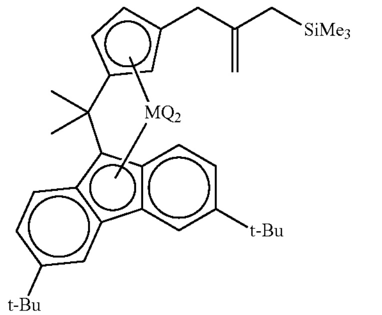

[Formula 1-2]

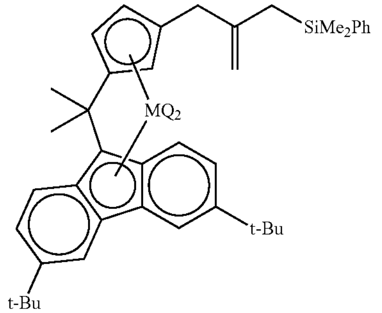

[Formula 1-3]

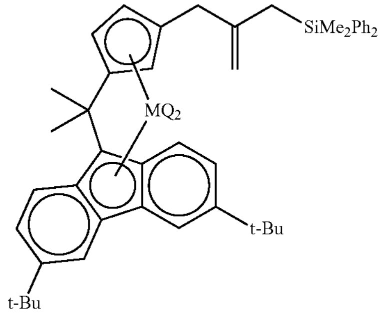

-continued

[Formula 1-4]

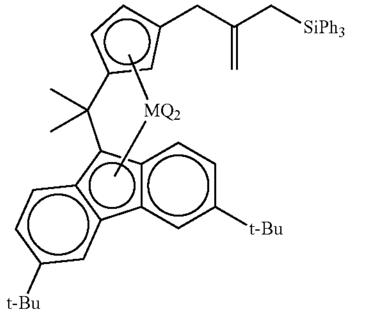

[Formula 1-5]

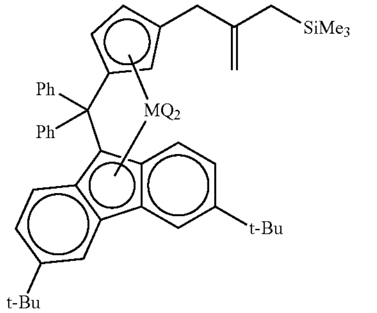

[Formula 1-6]

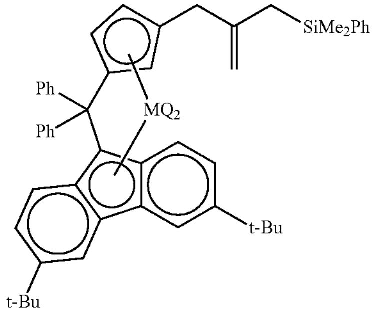

[Formula 1-7]

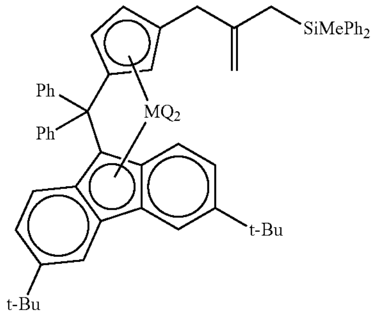

[Formula 1-8]

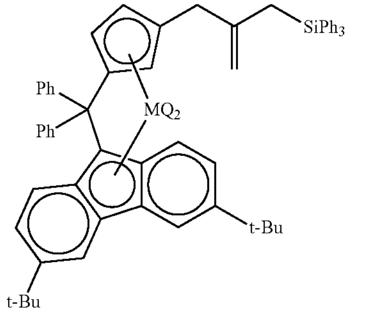

-continued
[Formula 1-9]
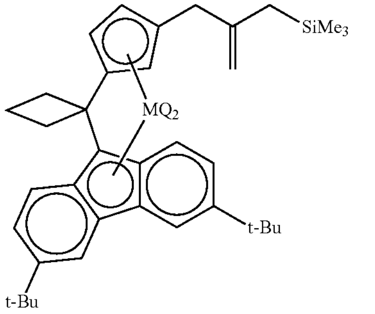
[Formula 1-10]
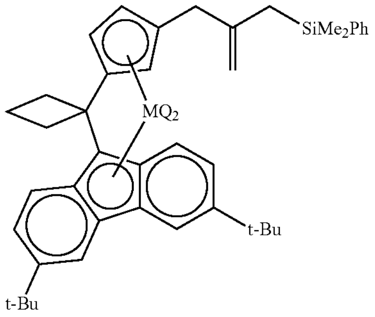
[Formula 1-11]
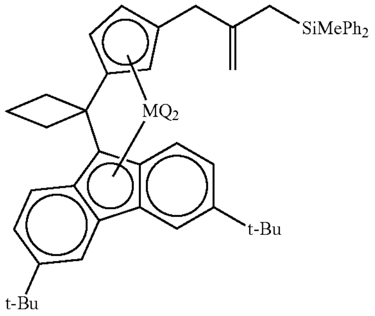
[Formula 1-12]
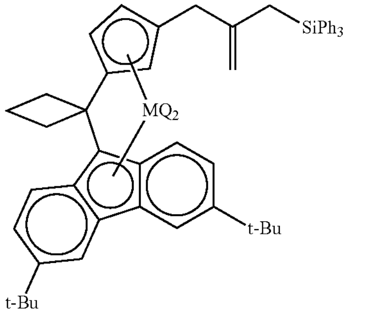
[Formula 1-13]
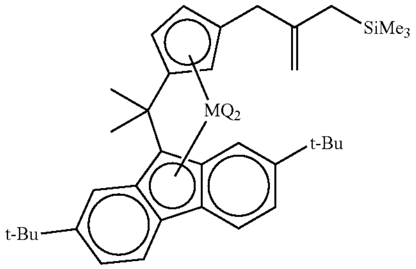
-continued
[Formula 1-14]
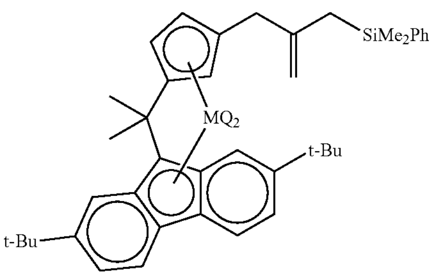
[Formula 1-15]
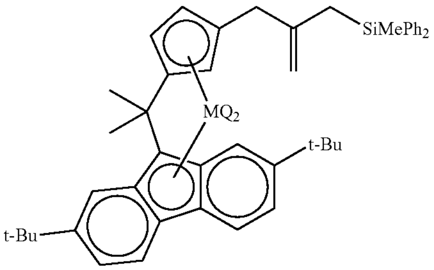
[Formula 1-16]
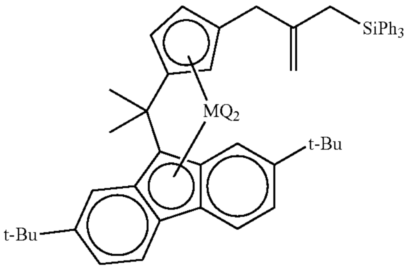
[Formula 1-17]
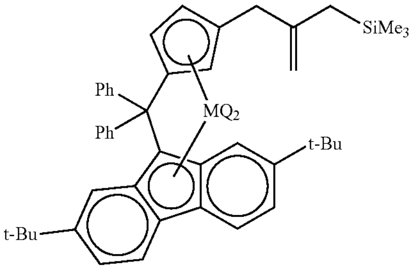
[Formula 1-18]
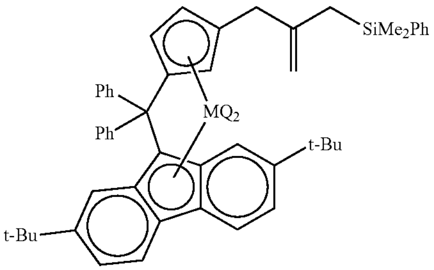

-continued
[Formula 1-19]
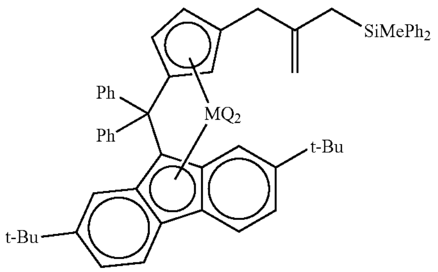
[Formula 1-20]
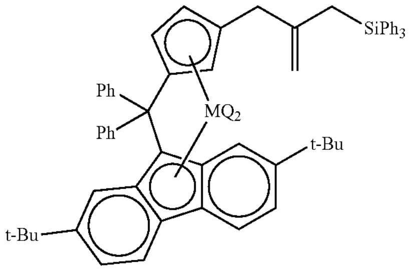
[Formula 1-21]
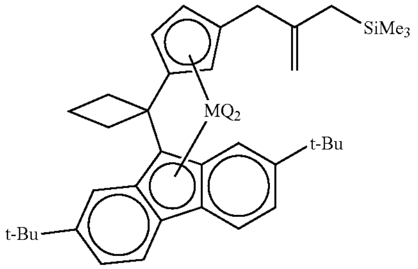
[Formula 1-22]
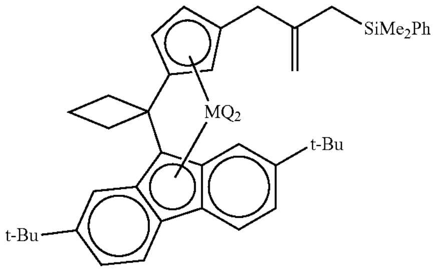
[Formula 1-23]
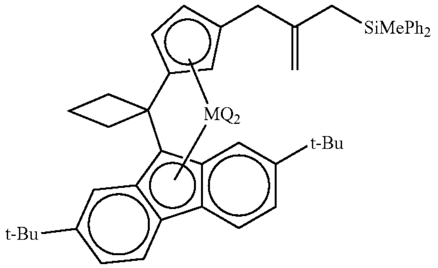
-continued
[Formula 1-24]
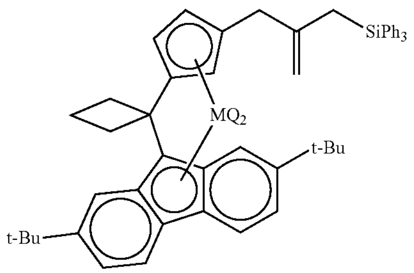
[Formula 1-25]
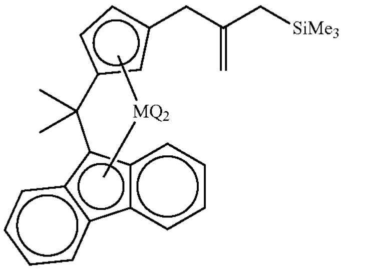
[Formula 1-26]
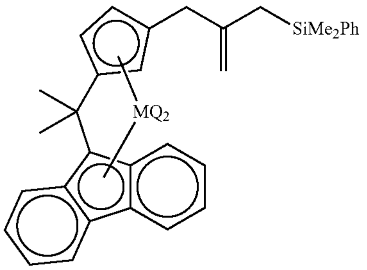
[Formlula 1-27]
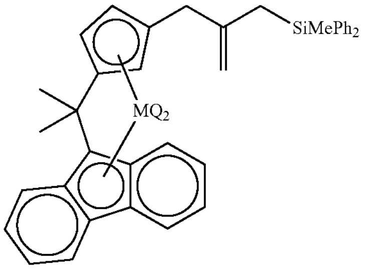
[Formula 1-28]
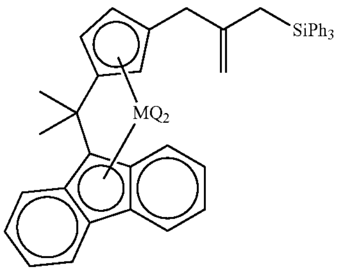

-continued

[Formula 1-29]

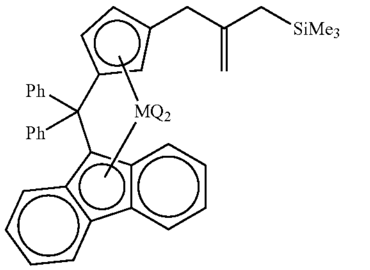

[Formula 1-30]

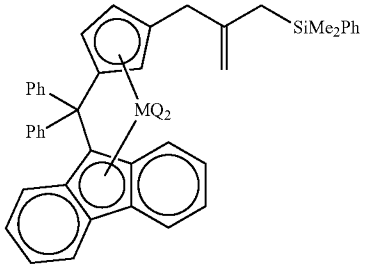

[Formula 1-31]

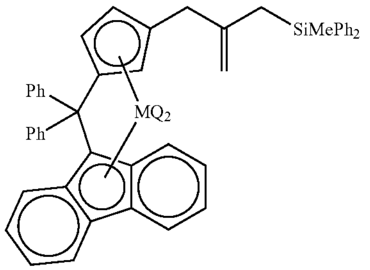

[Formula 1-32]

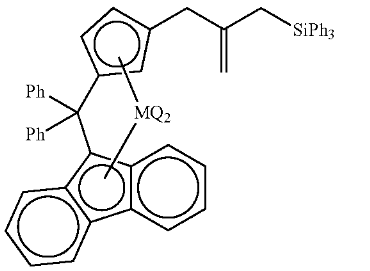

[Formula 1-33]

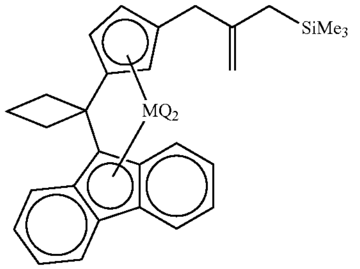

[Formula 1-34]

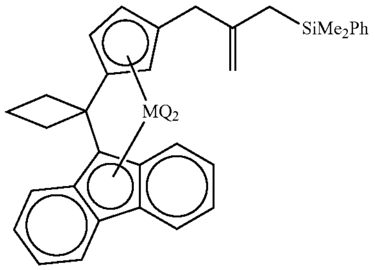

-continued

[Formula 1-35]

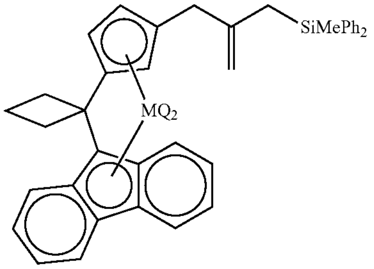

[Formula 1-36]

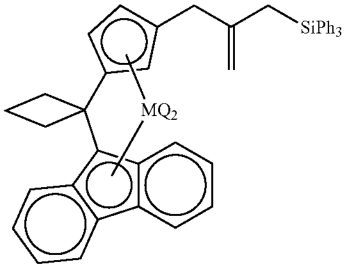

in Formulae 1-1 to 1-38, M is zirconium or hafnium, Q is each halogen or substituted or unsubstituted $C_{1-20}$ alkyl, Me is a methyl group, t-Bu is a t-butyl group, and Ph is a phenyl group.

4. The transition metal compound of claim 1, wherein the compound represented by Formula 1 is any one of the compounds represented by Formulae 1-37 to 1-39:

[Formula 1-37]

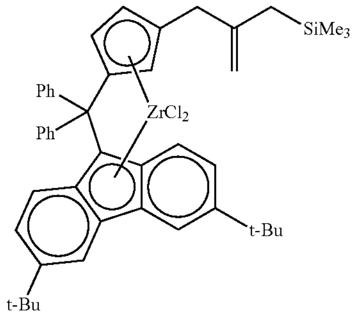

[Formula 1-38]

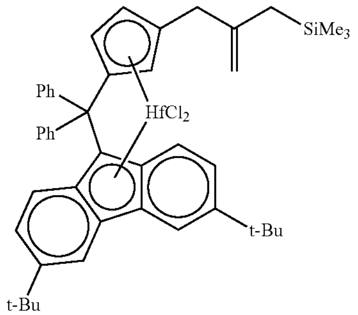

-continued

[Formula 1-39]

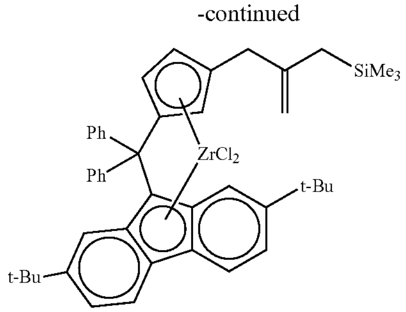

in Formulae 1-37 to 1-39, Me is a methyl group, t-Bu is a t-butyl group, and Ph is a phenyl group.

5. A catalyst for olefin polymerization, which comprises the transition metal compound of claim 1 and a cocatalyst compound.

6. The catalyst for olefin polymerization of claim 5, wherein the cocatalyst compound is at least one selected from the group consisting of a compound represented by Formula 2, a compound represented by Formula 3, and a compound represented by Formula 4:

[Formula 2]

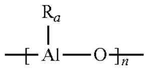

[Formula 3]

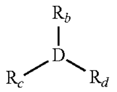

[Formula 4]

$[L—H]^+[Z(A)_4]^-$ or $[L]+[Z(A)_4]^-$ in Formula 2, n is an integer of 2 or more, and $R_a$ may each independently be a halogen atom, $C_{1-20}$ hydrocarbon, or $C_{1-20}$ hydrocarbon substituted with halogen, in Formula 3, D is aluminum (Al) or boron, and $R_b$, $R_c$, and $R_d$ are each independently a halogen atom, $C_{1-20}$ hydrocarbon, $C_{1-20}$ hydrocarbon substituted with halogen, or $C_{1-20}$ alkoxy, and in Formula 4, L is a neutral or cationic Lewis acid, $[L-H]^+$ and $[L]^+$ a Brönsted acid, Z is a group 13 element, and A is each independently substituted or unsubstituted $C_{6-20}$ aryl or substituted or unsubstituted $C_{1-20}$ alkyl.

7. The catalyst for olefin polymerization of claim 6, wherein the compound represented by Formula 2 is at least one selected from the group consisting of methylaluminoxane, ethylaluminoxane, isobutylaluminoxane, and butylaluminoxane.

8. The catalyst for olefin polymerization of claim 6, wherein the compound represented by Formula 3 is at least one selected from the group consisting of trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentyaluminum, trihexyaluminum, trioctyaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, and tributylboron.

9. The catalyst for olefin polymerization of claim 6, wherein the compound represented by Formula 4 is at least one selected from the group consisting of triethylammonium tetraphenylborate, tributylammonium tetraphenylborate, trimethylammonium tetraphenylborate, tripropylammonium tetraphenylborate, trimethylammonium tetra(p-tolyl)borate, trimethylammonium tetra(o,p-dimethylphenyl)borate, tributylammonium tetra(p-trifluoromethylphenyl)borate, trimethylammonium tetra(p-trifluoromethylphenyl)borate, tributylammonium tetrapentafluorophenylborate, N,N-diethylanilinium tetraphenylborate, N,N-diethylanilinium tetrapentafluorophenylborate, diethylammonium tetrapentafluorophenylborate, triphenylphosphonium tetraphenylborate, trimethylphosphonium tetraphenylborate, triethylammonium tetraphenylaluminate, tributylammonium tetraphenylaluminate, trimethylammonium tetraphenylaluminate, tripropylammonium tetraphenylaluminate, trimethylammonium tetra(p-tolyl)aluminate, tripropylammonium triethylammonium tetra(o,p-dimethylphenyl)aluminate, tetra(p-tolyl)aluminate, tributylammonium tetra(p-trifluoromethylphenyl)aluminate, trimethylammonium tetra (p-trifluoromethylphenyl)aluminate, tributylammonium tetrapentafluorophenylaluminate, N,N-diethylanilinium tetraphenylaluminate, N,N-diethylanilinium tetrapentafluorophenylaluminate, diethylammonium tetrapentatetraphenylaluminate, triphenylphosphonium tetraphenylaluminate, trimethylphosphonium tetraphenylaluminate, tripropylammonium tetra(p-tolyl)borate, triethylammonium tetra(o,p-dimethylphenyl)borate, tributylammonium tetra(p-trifluoromethylphenyl)borate, triphenylcarbonium tetra(p-trifluoromethylphenyl)borate, and triphenylcarbonium tetrapentafluorophenylborate.

10. The catalyst for olefin polymerization of claim 5, which further comprises a carrier for supporting the transition metal compound, the cocatalyst compound, or both.

11. The catalyst for olefin polymerization of claim 10, wherein the carrier comprises at least one selected from the group consisting of silica, alumina, and magnesia.

12. The catalyst for olefin polymerization of claim 10, wherein the amount of the transition metal compound supported on the carrier is 0.001 to 1 mmole based on 1 g of the carrier, and the amount of the cocatalyst compound supported on the carrier is 2 to 15 mmoles based on the 1 g of the carrier.

13. A method for preparing a polyolefin by polymerizing an olefinic monomer in the presence of the catalyst for olefin polymerization of claim 5.

14. The method of claim 13, wherein the olefinic monomer is at least one selected from the group consisting of a $C_{2-20}$ alpha-olefin, a $C_{1-20}$ diolefin, a $C_{3-20}$ cycloolefin, and a $C_{3-20}$ cyclodiolefin.

15. The method of claim 13, wherein the polyolefin is obtained by copolymerizing ethylene and 1-hexene.

* * * * *